United States Patent
Kim et al.

(10) Patent No.: US 10,469,773 B2
(45) Date of Patent: Nov. 5, 2019

(54) IMAGE SENSOR, DATA PROCESSING SYSTEM INCLUDING THE SAME

(71) Applicant: Samsung Electronics Co., Ltd., Suwon-si, Gyeonggi-do (KR)

(72) Inventors: Byung Jo Kim, Seoul (KR); Seog Heon Ham, Suwon-si (KR); Sung Ho Suh, Hwaseong-si (KR); Se Jun Kim, Seoul (KR); Young Tae Jang, Pyeongtaek-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 16/003,577

(22) Filed: Jun. 8, 2018

(65) Prior Publication Data

US 2018/0295297 A1   Oct. 11, 2018

Related U.S. Application Data

(63) Continuation of application No. 14/989,244, filed on Jan. 6, 2016, now Pat. No. 10,015,414.

(30) Foreign Application Priority Data

Mar. 10, 2015   (KR) .................. 10-2015-0033393

(51) Int. Cl.
*H04N 5/347* (2011.01)
*H04N 9/04* (2006.01)
*H04N 5/3745* (2011.01)
*H04N 5/378* (2011.01)

(52) U.S. Cl.
CPC ............. *H04N 5/347* (2013.01); *H04N 5/378* (2013.01); *H04N 5/37457* (2013.01); *H04N 9/045* (2013.01)

(58) Field of Classification Search
CPC .... H04N 5/347; H04N 5/378; H04N 5/37457; H04N 5/23212
See application file for complete search history.

(56) References Cited

U.S. PATENT DOCUMENTS

| | | | |
|---|---|---|---|
| 8,759,736 B2 | 6/2014 | Yoo | |
| 10,015,414 B2* | 7/2018 | Kim | H04N 5/347 |
| 2012/0312963 A1* | 12/2012 | Storm | H04N 5/347 |
| | | | 250/208.1 |
| 2013/0076972 A1 | 3/2013 | Okita | |
| 2013/0087875 A1 | 4/2013 | Kobayashi et al. | |
| 2013/0193334 A1 | 8/2013 | Dowaki | |
| 2013/0235253 A1 | 9/2013 | Onuki et al. | |
| 2014/0049675 A1 | 2/2014 | Takatsuka et al. | |
| 2014/0085522 A1 | 3/2014 | Yatsunami et al. | |
| 2014/0125861 A1 | 5/2014 | Sugie et al. | |

(Continued)

FOREIGN PATENT DOCUMENTS

| KR | 20120045811 A | 5/2012 |
|---|---|---|
| KR | 20120046580 A | 5/2012 |

*Primary Examiner* — Christopher K Peterson
(74) *Attorney, Agent, or Firm* — Harness, Dickey & Pierce, P.L.C.

(57) ABSTRACT

An image sensor includes a pixel array and N analog-to-digital converters (ADCs). The pixel array includes N pixels arranged in each of a plurality of rows, and each of the N pixels include M photoelectric conversion elements. At least one of the N ADCs are shared by at least one of the M photoelectric conversion elements included in each of the N pixels.

20 Claims, 22 Drawing Sheets

(56) References Cited

U.S. PATENT DOCUMENTS

| | | |
|---|---|---|
| 2014/0139716 A1 | 5/2014 | Sasaki et al. |
| 2014/0145067 A1 | 5/2014 | Suh et al. |
| 2014/0146218 A1 | 5/2014 | Kunieda et al. |
| 2014/0192248 A1 | 7/2014 | Kishi |
| 2014/0192249 A1 | 7/2014 | Kishi |
| 2014/0284449 A1 | 9/2014 | Uchida |
| 2015/0189249 A1 | 7/2015 | Hiyama et al. |

* cited by examiner

| LV | Frame 0 | AF1 | Frame 1 | AF2 | Frame 2 | AF3 | Frame 3 |

| LV | Frame 0 | AF1 | Frame 1 | Frame 2 | AF2 | Frame 3 |

IMAGE SENSOR, DATA PROCESSING SYSTEM INCLUDING THE SAME

CROSS-REFERENCE TO RELATED APPLICATION

This is a continuation of U.S. application Ser. No. 14/989,244, filed Jan. 6, 2016, which claims priority under 35 U.S.C. § 119(a) from Korean Patent Application No. 10-2015-0033393 filed in the Korean Intellectual Property Office on Mar. 10, 2015, the disclosure of each which is hereby incorporated by reference in its entirety.

BACKGROUND

Field

Example embodiments of the inventive concepts relate to an image sensor, and more particularly, to an image sensor which has a 1-microlens multi-photodiode structure and includes an analog-to-digital converter there within, and/or an image processing system including the same.

Description of Related Art

An auto-focus (AF) performance is one of the most important performances of a camera. Conventionally, cameras do not use a separate AF sensor, instead conventional cameras use phase difference information provided by an image sensor when performing AF.

A conventional image sensor having a 1-microlens multi-photodiode structure has an analog-to-digital converter outside and analog-to-digital conversion is performed outside the image sensor. Accordingly, the image sensor outputs phase difference information even when the phase difference information is not necessary during image processing. As a result, an image data output speed of the image sensor is decreased and power consumption is increased.

SUMMARY

Some non-limiting example embodiments of the inventive concepts provide an image sensor that has a 1-microlens multi-photodiode structure, and includes an analog-to-digital converter inside to increase an image data output speed and decrease power consumption; and an image processing system including the image sensor.

According to some non-limiting example embodiments of the inventive concepts, there is provided an image sensor including N pixels arranged in each of plurality of rows, each of the N pixels include at least one of M photoelectric conversion elements; and N analog-to-digital converters (ADCs). The N ADCs may be shared by at least one of the M photoelectric conversion elements included in each of the N pixels.

Additionally, in some non-limiting example embodiments, each of the N pixels may be associated with M floating diffusion nodes. Charges output from each of the M photoelectric conversion elements included in each of the N pixels may be transferred to the M floating diffusion nodes, wherein each of the M floating diffusion nodes corresponds to at least one of the M photoelectric conversion elements. Additionally, each of the N pixels may be associated with N floating diffusion nodes, and charges output from each of the M photoelectric conversion elements included in each of the N pixels may be transferred to the N floating diffusion nodes.

Additionally, in a non-limiting example embodiment, each of the N pixels may include a first pixel which is arranged in a first row and includes a first photoelectric conversion element and a second photoelectric conversion element, and a second pixel which is arranged in a second row adjacent to the first row and includes a third photoelectric conversion element and a fourth photoelectric conversion element. The first and the third photoelectric conversion elements may share with each other a first floating diffusion node corresponding to the first photoelectric conversion element and the third photoelectric conversion element; and the second photoelectric conversion element and fourth photoelectric conversion element may share with each other a second floating diffusion node corresponding to the second and fourth photoelectric conversion elements.

Additionally, in a non-limiting example embodiment, each of the pixels may include a first pixel arranged in a first row, and a second pixel arranged in a second row, wherein the second row is adjacent to the first row. The first and the second pixels of the N pixels may share with each other one of the floating diffusion nodes corresponding to the first and the second pixels. Here, M and N may be natural numbers and M may be greater than N.

The image sensor may further include a binning circuit configured to bin pixel signals output from each of the N pixels, and each of the N pixels may include a first pixel and a second pixel. The first pixel including a first photoelectric conversion element and a second photoelectric conversion element, and the second pixel including a third photoelectric conversion element and a fourth photoelectric conversion element. When the first pixel and the second pixel are arranged in one row, the binning circuit may generate a first pixel signal using first charges output from the first photoelectric conversion element, second charges output from the second photoelectric conversion element. Additionally, the binning circuit may also, generate a second pixel signal using third charges output from the third photoelectric conversion element, and fourth charges output from the fourth photoelectric conversion element, which may bin the first pixel signal and the second pixel signal and may transmit a binned pixel signal to a first ADC selected from the N ADCs.

Additionally, in some example embodiments of the inventive concepts, the image sensor may further include a binning circuit configured to bin pixel signals output from each of the N pixels, and each of the N pixels may include a first pixel and a second pixel. The first pixel includes a first photoelectric conversion element, and a second photoelectric conversion element. The second pixel including a third photoelectric conversion element, and a fourth photoelectric conversion element. When the first pixel and the second pixel are arranged in one row, the binning circuit may be configured to bin first charges output from the first photoelectric conversion element and third charges output from the third photoelectric conversion element, in order to generate a first binned pixel signal. Additionally, the bin circuit may be configured to bin second charges output from the second photoelectric conversion element, fourth charges output from the fourth photoelectric conversion element to generate a second binned pixel signal, and may be configured to transmit the first binned pixel signal to a first ADC selected from the N ADCs, and the second binned pixel signal to a second ADC selected from the N ADCs.

Additionally, in some example embodiments of the inventive concepts, the image sensor may further include a binning circuit configured to bin pixel signals output from each of the pixels, and each of the pixels may include a first pixel and a second pixel. The first pixel including a first photoelectric conversion element, and a second photoelectric conversion element. The second pixel including a third photoelectric conversion element, and a fourth photoelectric conversion element. When the first pixel and the second pixel are arranged in one row, the binning circuit may be configured to generate a first pixel signal using first charges output from the first photoelectric conversion element, and second charges output from the second photoelectric conversion element; the binning circuit may additionally be configured to generate a second pixel signal using third charges output from the third photoelectric conversion element, fourth charges output from the fourth photoelectric conversion element, and may be configured to transmit the first pixel signal to a first ADC selected from the N ADCs and the second pixel signal to a second ADC selected from the N ADCs.

Additionally, in some non-limiting example embodiments of the inventive concepts, the image sensor may further include a binning circuit configured to bin pixel signals output from each of the pixels, and each of the pixels may include a first pixel and a second pixel. The first pixel including a first photoelectric conversion element and a second photoelectric conversion element, and the second pixel including a third photoelectric conversion element and a fourth photoelectric conversion element. When the first pixel and the second pixel are arranged in one row, the binning circuit may bin first charges output from the first photoelectric conversion element and third charges output from the third photoelectric conversion element to generate a first binned pixel signal, and may bin second charges output from the second photoelectric conversion element and fourth charges output from the fourth photoelectric conversion element to generate a second binned pixel signal. The binning circuit may additionally be configured to transmit the first binned pixel signal to a first ADC selected from the N ADCs and the second binned pixel signal to the first ADC.

Additionally, in some non-limiting example embodiments of the inventive concepts, there is provided a data processing system including an image sensor and a controller configured to control an operation of the image sensor. The image sensor may include N pixels arranged in each row, each of the N pixels including M photoelectric conversion elements; and N ADCs. Each of the ADCs may be shared by the M photoelectric conversion elements included in each of the N pixels. M and N may be natural numbers and M may be greater than N.

Additionally, as a non-limiting example embodiment, each of the N pixels may be associated with M floating diffusion nodes, and charges output from each of the M photoelectric conversion elements included in each of the N pixels may be transferred to the floating diffusion nodes corresponding to the photoelectric conversion elements among the M floating diffusion nodes. Additionally, in some example embodiments of the inventive concepts, each of the N pixels may include N floating diffusion nodes and charges output from the photoelectric conversion elements included in each pixel may be transferred to floating diffusion nodes corresponding to the photoelectric conversion elements among the N floating diffusion nodes.

Additionally, as a non-limiting example embodiment, each of the pixels may include a first pixel and a second pixel. The first pixel, which is arranged in a first row, includes a first photoelectric conversion element and a second photoelectric conversion element. The second pixel, which is arranged in a second row, adjacent to the first row, includes a third photoelectric conversion element and a fourth photoelectric conversion element. The first and the third photoelectric conversion elements may share a first floating diffusion node corresponding to the first and the third photoelectric conversion elements with each other, and the second and fourth photoelectric conversion elements may share a second floating diffusion node corresponding to the second and the fourth photoelectric conversion elements with each other.

Additionally, in some non-limiting example embodiments of the inventive concepts, each of the N pixels may include a first pixel arranged in a first row and a second pixel arranged in a second row adjacent to the first row, and the first and the second pixels may share one of the floating diffusion nodes corresponding to the first and the second pixels with each other. Each of the N pixels may include first pixels arranged in a first row and second pixels arranged in a second row and the controller may control the image sensor to read out pixels signals output from the first pixels, and to skip readout of pixel signals output from the second pixels.

Additionally, in some non-limiting example embodiments of the inventive concepts, an image sensor comprising a first pixel including a first photoelectric conversion element; a second pixel including a second photoelectric conversion element; and a first floating diffusion node, the first photoelectric conversion element and the second photoelectric conversion element share the first floating diffusion node. In some non-limiting example embodiments of the inventive concepts, the first pixel further includes a third photoelectric conversion element, the second pixel further includes a fourth photoelectric conversion element, and the third photoelectric conversion element and the fourth photoelectric conversion element share a second floating diffusion node.

Additionally, in some non-limiting example embodiments of the inventive concepts, the image sensor further comprises a first analog-to-digital converter (ADC) and a binning circuit. The ADC shared by the first photoelectric conversion element and the second photoelectric conversion element; and the binning circuit configured to bin pixel signals output from the first pixel and the second pixel.

Additionally, in some non-limiting example embodiments of the inventive concepts, the binning circuit is configured to, generate a first pixel signal using charges output from the first photoelectric conversion element and the third photoelectric conversion element; generate a second pixel signal using charges output from the second photoelectric conversion element and the fourth photoelectric conversion element; and transmit the binned pixel signal to a first analog-to-digital converter (ADC) based on the first pixel signal and the second pixel signal.

BRIEF DESCRIPTION OF THE DRAWINGS

The foregoing and other features will be apparent from the more particular description of non-limiting example embodiment of the inventive concepts, as illustrated in the accompanying drawings in which like reference characters refer to like parts throughout the different views. The drawings are not necessarily to scale, emphasis instead being placed upon illustrating principles of the inventive concepts. In the drawings.

DETAILED DESCRIPTION OF THE EMBODIMENTS

Figure 1:
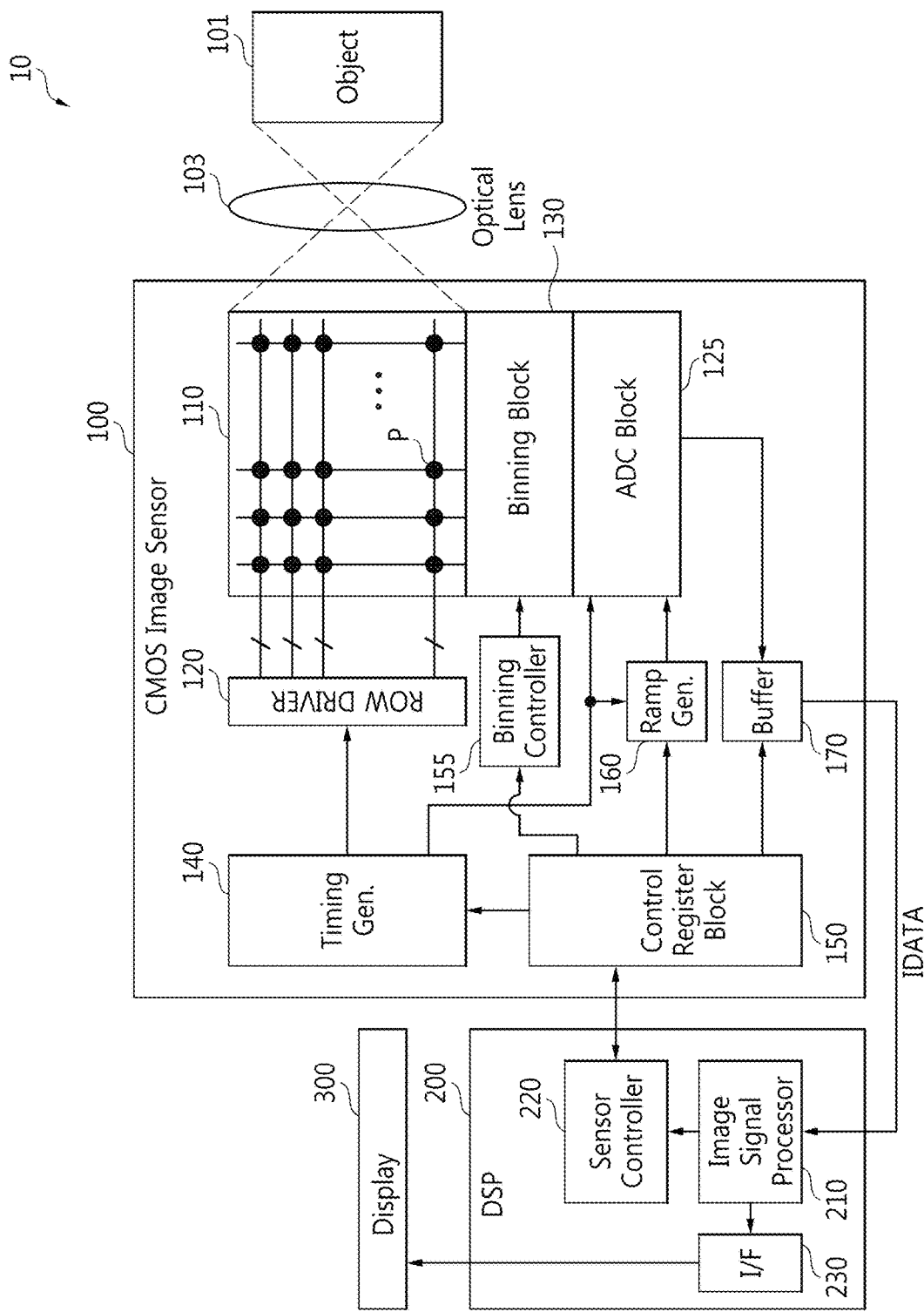
FIG. 1 is a block diagram of an image processing system according to some example embodiments of the inventive concept.

The example embodiments of the inventive concepts will now be described more fully hereinafter with reference to the accompanying drawings, in which example embodiments of the inventive concepts are shown. The example embodiment of inventive concepts may, however, be embodied in many different forms and should not be construed as limited to the embodiments set forth herein. Rather, these example embodiments are provided so that this disclosure will be thorough and complete, and will fully convey the scope of the inventive concepts to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements or layers should be interpreted in a like fashion (e.g., "between" versus "directly between," "adjacent" versus "directly adjacent," "on" versus "directly on"). As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein. As used herein, the term "and/or" includes any and all combinations of one or more of the associated listed items.

FIG. 1 is a block diagram of an image processing system 10 according to some example embodiments of the inventive concepts. Referring to FIG. 1, The image processing system 10 may be implemented as a portable electronic device such as, including but not limited to, a laptop computer, a cellular phone, a smart phone, a tablet personal computer (PC), a personal digital assistant (PDA), an enterprise digital assistant (EDA), a digital still camera, a digital video camera, a portable multimedia player (PMP), a mobile internet device (MID), a wearable computer, an internet of things (IoT) device, or an internet of everything (IoE) device. The image processing system 10 may include an optical lens 103, a complementary metal-oxide-semiconductor (CMOS) image sensor 100, a digital signal processor (DSP) 200, and a display 300.

The CMOS image sensor 100 may generate image data IDATA corresponding to an object input through the optical lens 103. The image data IDATA may correspond to pixel signals output from a plurality of photoelectric conversion elements. A photoelectric conversion element may be implemented as a photodiode, a phototransistor, a photogate, or a pinned-photodiode. The CMOS image sensor 100 may include a pixel array 110, a row driver 120, an analog-to-digital converter (ADC) block 125, a binning block 130, a timing generator 140, a control register block 150, a binning controller 155, a ramp generator 160, and a buffer 170.

The pixel array 110 may include a plurality of pixels P arranged in two dimensions. The pixels P of the CMOS image sensor 100 may be manufactured using CMOS manufacturing processes. Each of the pixels P may include a plurality of photoelectric conversion elements. In some example embodiments of the inventive concepts, N pixels may be arranged in each of a plurality of rows in the pixel array 110 and each of the N pixels may include M photoelectric conversion elements, where N and M are natural numbers of at least 2. For instance, each pixel may include two or four photoelectric conversion elements.

Each of the pixels P included in the pixel array 110 may include a photodiode. The photodiode is an example of a photoelectric conversion element and may be replaced with a phototransistor, a photogate, or a pinned-photodiode. The pixels P may be arranged in a matrix in the pixel array 110. Each of the pixels P may transmit a pixel signal to a column line.

The row driver 120 may drive control signals for controlling the operation of the pixels P to the pixel array 110 according to the control of the timing generator 140. The row driver 120 may function as a control signal generator which generates the control signals.

The timing generator 140 may control the operations of the row driver 120, the ADC block 125, and the ramp generator 160 according to the control of the control register block 150. The timing generator 140 may control the operation of the ADC block 125 and activate or deactivate ADCs included in the ADC block 125 according to the control of the control register block 150.

The binning block 130 may bin a pixel signal output from each of the pixels P included in the pixel array 110 and may output a binned pixel signal. The binning block 130 may include a binning circuit including a plurality of switches. The binning block 130 may output the binned pixel signal to the ADC block 125 according to the operation of the switches. The binning block 130 may include a plurality of binning circuits.

The ADC block 125 may include an ADC and memory for each column. The ADC may perform correlated double sampling (CDS). The ADC block 125 may include a plurality of ADCs. Each of the ADCs may be shared by photoelectric conversion elements in each pixel. The ADC block 125 may generate a digital image signal corresponding to the binned pixel signal output from the binning block 130.

The control register block 150 may control the operations of the timing generator 140, the binning controller 155, the ramp generator 160, and the buffer 170 according to the control of the DSP 200. The binning controller 155 may control the binning block 130 according to the control of the control register block 150. The binning controller 155 may control a switch circuit included in the binning block 130.

The buffer 170 may transmit the image data IDATA corresponding to digital image signals output from the ADC block 125 to the DSP 200. The DSP 200 may include an image signal processor (ISP) 210, a sensor controller 220, and an interface (UF) 230.

The ISP 210 may control the OF 230 and the sensor controller 220 which controls the control register block 150. The CMOS image sensor 100 and the DSP 200 may be implemented in a single package, e.g., a multi-chip package (MCP). Although the CMOS image sensor 100 and the ISP 210 are separated from each other in FIG. 1, the ISP 210 may be implemented as a part of the CMOS image sensor 100 in some example embodiments of the inventive concepts.

The ISP 210 may process the image data IDATA received from the buffer 170 and may transmit processed image data to the OF 230. In detail, the ISP 210 may interpolate the image data IDATA corresponding to pixel signals output from the pixels P to generate interpolated image data.

The sensor controller 220 may generate various control signals for controlling the control register block 150 according to the control of the ISP 210. The OF 230 may transmit the processed image data, i.e., the interpolated image data from the ISP 210 to the display 300.

The display 300 may display the interpolated image data output from the I/F 230. The display 300 may be, including but not limited to, a thin film transistor-liquid crystal display (TFT-LCD), a light emitting diode (LED) display, an organic LED (OLED) display, an active-matrix OLED (AMOLED) display, or a flexible display.

Figure 2:
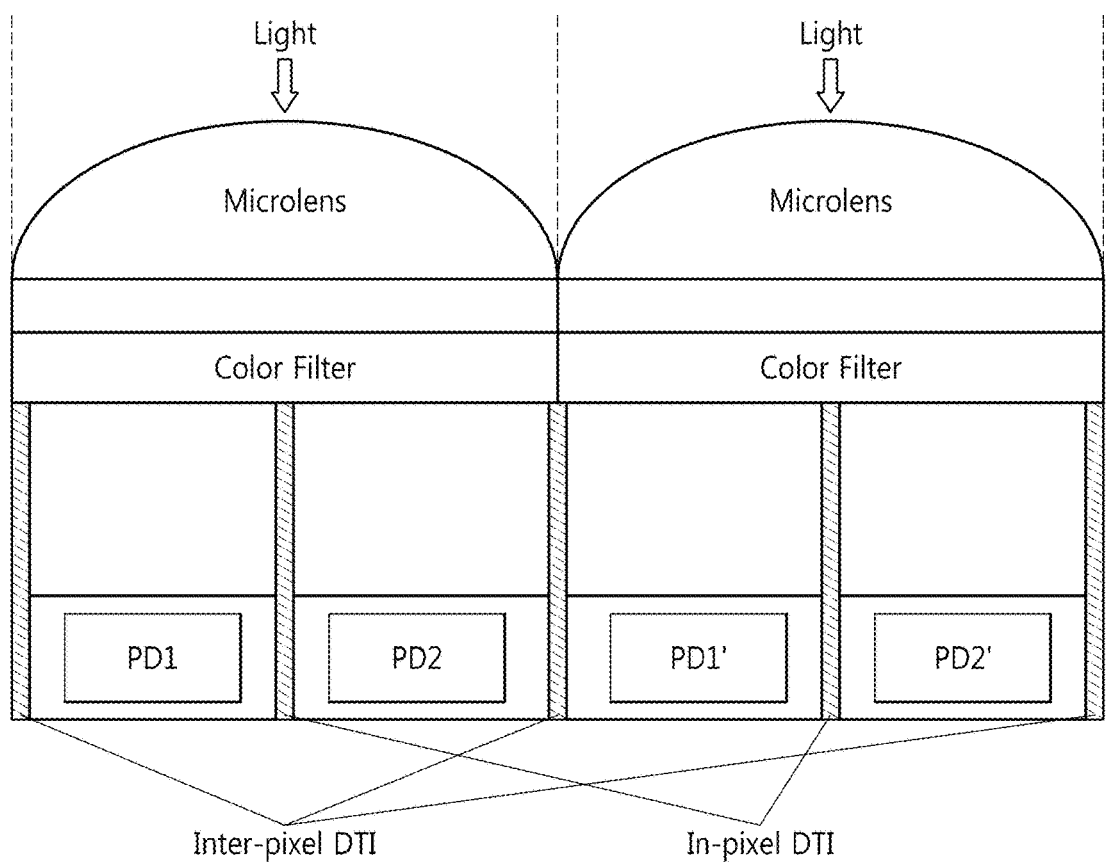
FIG. 2 is a cross sectional view of a pixel including two photodiodes.

FIG. 2 is a cross sectional view of a pixel including two photodiodes. The pixel may be one of the pixels P illustrated in FIG. 1. Photodiodes PD1 and PD1' may generate photocharges independently from each other and photodiodes PD2 and PD2' may generate photocharges independently from each other. The photodiode PD1 or PD1' may generate one of a long-exposure image signal and a short-exposure image signal and the photodiode PD2 or PD2' may generate the other one of the long-exposure image signal and the short-exposure image signal.

Two photodiodes PD1 and PD2 or PD1' and PD2' may be formed in a silicon substrate and a deep trench isolation (DTI) may be formed between the photodiodes PD1 and PD2 or PD1' and PD2'. In detail, an in-pixel DTI may be formed between the photodiodes PD1 and PD2 or PD1' and PD2' and an inter-pixel DTI may be formed between the pixels.

Metal wiring, multi-layer wiring, or wiring layers may be formed in a circuit area between the photodiodes PD1 and PD2 or PD1' and PD2' and a color filter. A lens buffer or a planarization layer may be formed between a microlens and the color filter.

Although each pixel includes two photodiodes in the example embodiment illustrated in FIG. 2, the number of photodiodes included in each pixel may vary.

Figure 3:
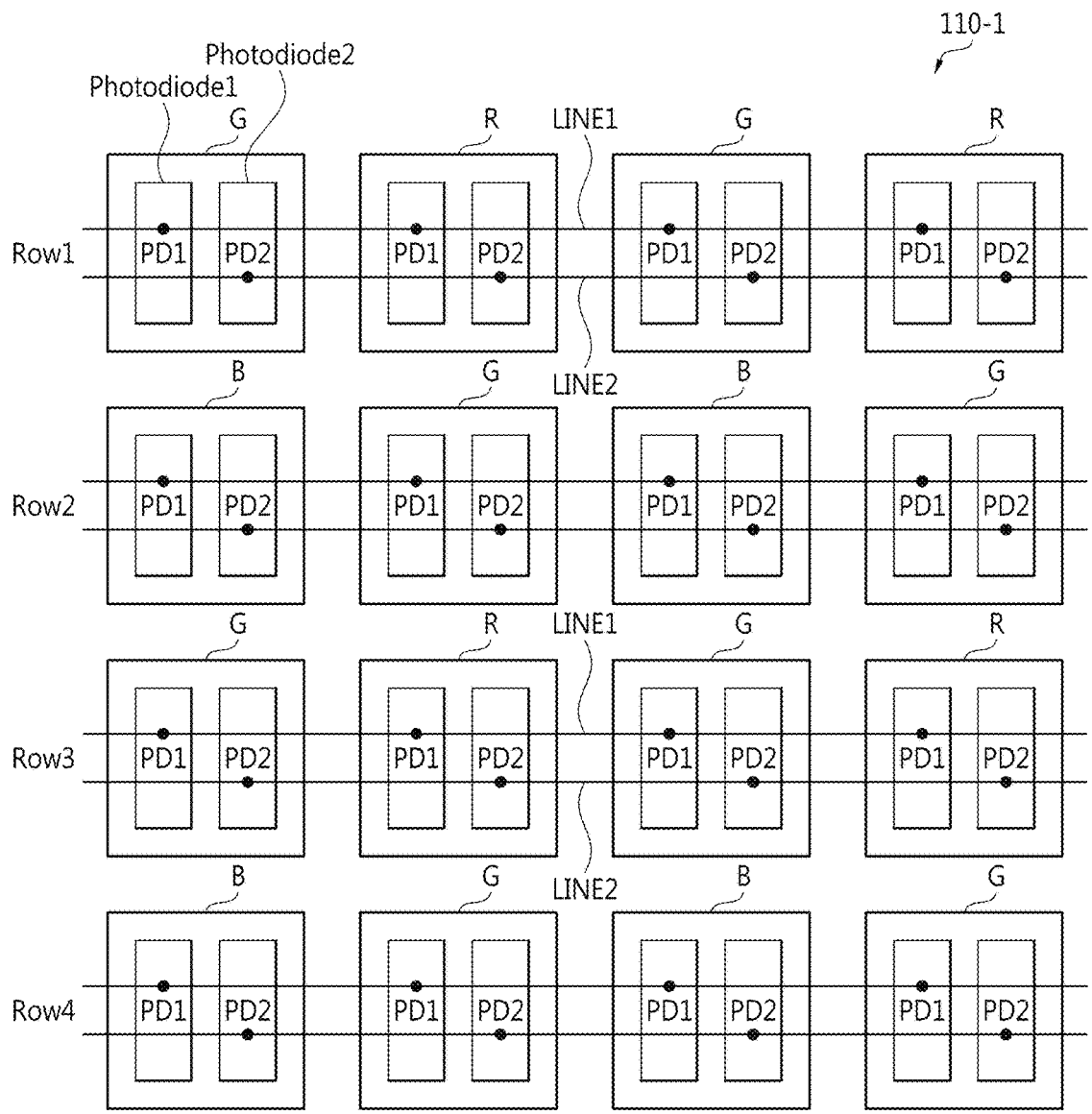
FIG. 3 is a diagram of a part of a pixel array illustrated in FIG. 1.

FIG. 3 is a diagram of a part of the pixel array 110 illustrated in FIG. 1. Referring to FIGS. 1 and 3, each pixel P may include two photodiodes PD1 and PD2 which operate independently from each other. In FIG. 3, PD1 denotes a first photodiode and PD2 denotes a second photodiode. The photodiodes PD1 and PD2 may operate independently from each other, and each may output an image signal. The first photodiode PD1 may generate a long-exposure image signal and the second photodiode PD2 may generate a short-exposure image signal. In FIG. 3, R denotes a red pixel, G denotes a green pixel, and B denotes a blue pixel. A microlens may be formed on each of the pixels R, G, and B.

Pixels G and R in each of rows Row1 and Row3 may each include two photodiodes PD1 and PD2. Pixels B and G in each of rows Row2 and Row4 may each include two photodiodes PD1 and PD2. An exposure time or an integration time of each of the photodiodes PD1 and PD2 included in each of the pixels R, G, and B may be independently controlled by a row driver. Although each of the pixels R, G, and B includes the photodiodes PD1 and PD2 side by side in the embodiments illustrated in FIG. 3, two photodiodes may be arranged above and below in each of the pixels R, G, and B in one example embodiments of the inventive concepts.

A gate of a transfer transistor connected to the photodiode PD1 of each pixel R, G, or B arranged in any of the rows Row1 through Row4 may be connected to a first transmission line (or a first metal line LINE1), and a gate of a transfer transistor connected to the photodiode PD2 of each pixel R, G, or B arranged in any of the rows Row1 through Row4 may be connected to a second transmission line (or a second metal line LINE2). Although the first photodiode PD1 is connected to the first transmission line LINE1, and the second photodiode PD2 is connected to the second transmission line LINE2 in the example embodiment illustrated in FIG. 3. In some example embodiments, the second photodiode PD2 may be connected to the first transmission line LINE1 and the first photodiode PD1 may be connected to the second transmission line LINE2.

Figure 4:
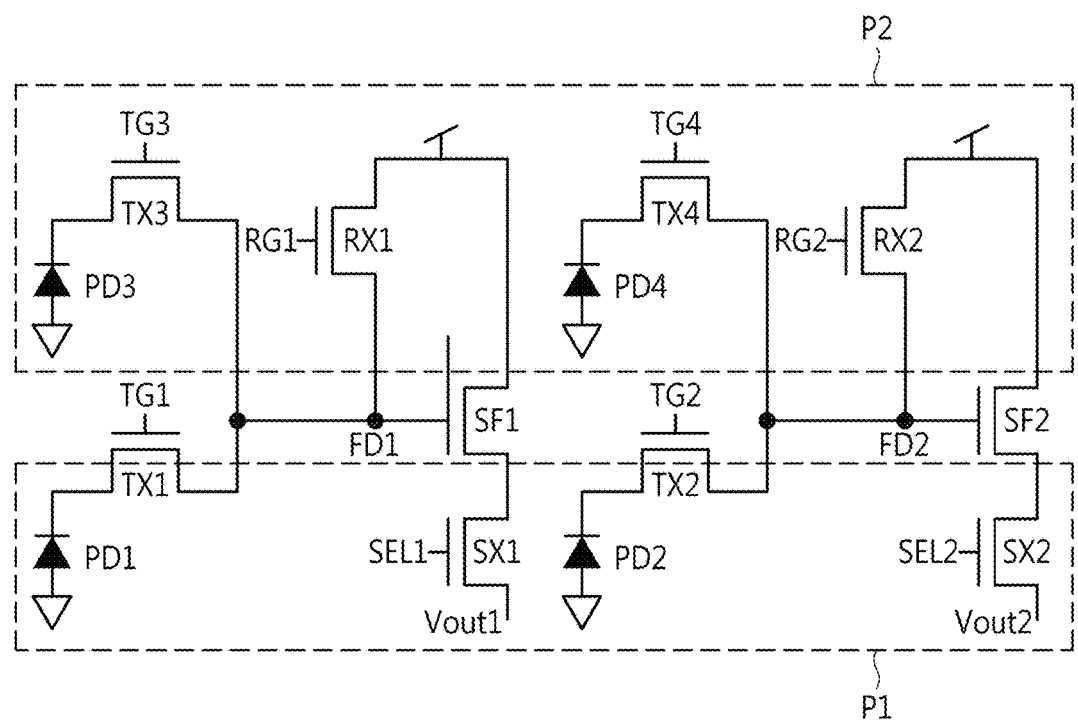
FIG. 4 is a circuit diagram of pixels including two photodiodes according to some example embodiments of the inventive concept.

FIG. 4 is a circuit diagram of pixels including two photodiodes according to some example embodiments of the inventive concepts. Referring to FIGS. 1 through 4, two photodiodes PD1 and PD2 are formed below a first microlens and two photodiodes PD3 and PD4 are formed below a second microlens. A readout circuit, which reads out pixel signals, is illustrated together with the photodiodes PD1 through PD4 in FIG. 4.

The readout circuit may include transfer transistors TX1 through TX4, reset transistors RX1 and RX2, source followers SF1 and SF2, and select transistors SX1 and SX2. Control signals TG1 through TG4, RG1, RG2, SEL1, and SEL2 for respectively controlling the transistors TX1 through TX4, RX1, RX2, SX1, and SX2 may be output from the row driver 120. Output signals Vout1 and Vout2 of the respective select transistors SX1 and SX2 may be applied to column lines, respectively.

A first pixel P1 in a first row includes the first photodiode PD1 and the second photodiode PD2. A second pixel P2 in a second row adjacent to the first row includes the third photodiode PD3 and the fourth photodiode PD4. The first photodiode PD1 and the third photodiode PD3 may share a first floating diffusion node FD1 with each other. The second photodiode PD2 and the fourth photodiode PD4 may share a second floating diffusion node FD2 with each other.

Figure 5:
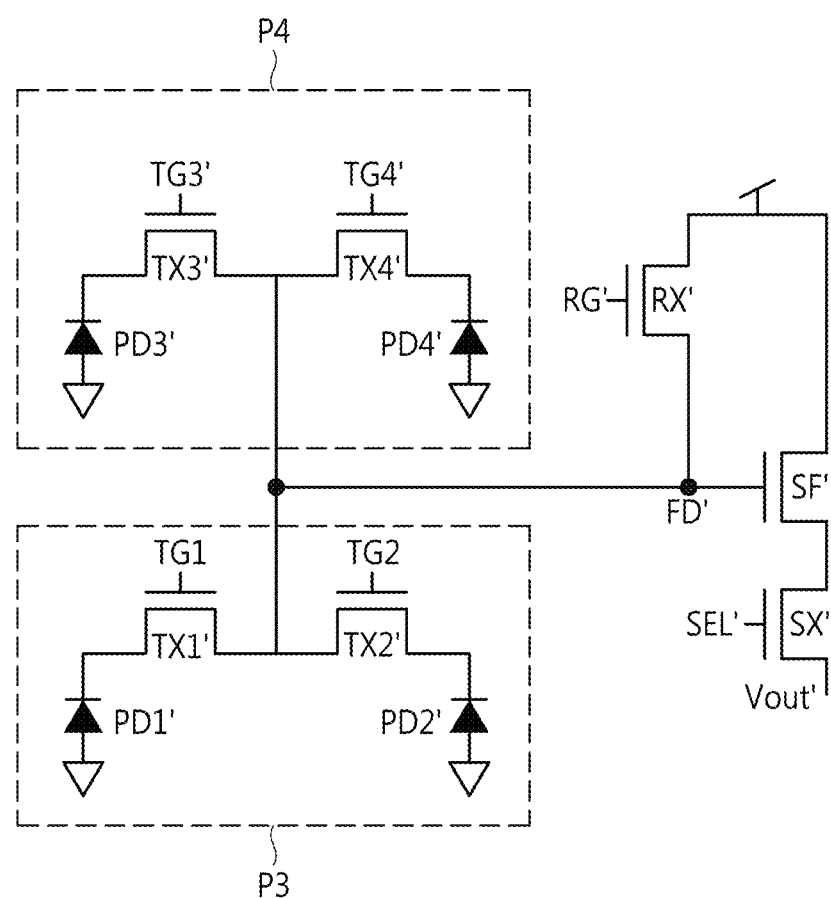
FIG. 5 is a circuit diagram of pixels including two photodiodes according to other example embodiments of the inventive concept.

FIG. 5 is a circuit diagram of pixels including two photodiodes according to some example embodiments of the inventive concepts. Referring to FIGS. 1 through 3 and FIG. 5, two photodiodes PD1' and PD2' are formed below a first microlens, and two photodiodes PD3' and PD4' are formed below a second microlens. A readout circuit which reads out pixel signals together with the photodiodes PD1' through PD4' is illustrated in FIG. 5.

The readout circuit may include transfer transistors TX1' through TX4', a reset transistor RX', a source follower SF', and a select transistor SX'. Control signals TG1' through TG4', RG', and SEL' for respectively controlling the transistors TX1' through TX4', RX', and SX' may be output from the row driver 120. An output signal Vout' of the select transistor SX' may be applied to a column line.

A first pixel P3 in a first row includes the first photodiode PD1' and the second photodiode PD2'. A second pixel P4 in a second row adjacent to the first row includes the third photodiode PD3' and the fourth photodiode PD4'. The photodiodes PD1' through PD4' may share a floating diffusion node FD' with each other.

Figure 6:
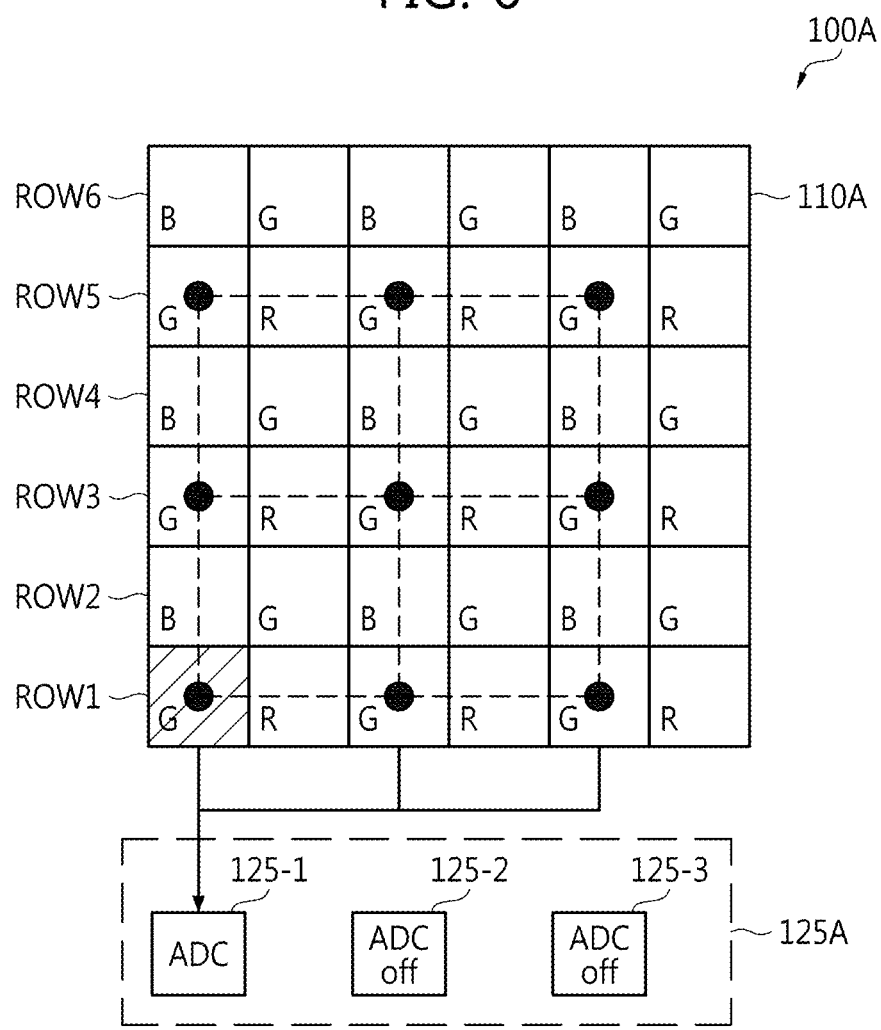
FIG. 6 is a block diagram showing the operation of an image sensor according to some example embodiments of the inventive concept.

FIG. 6 is a block diagram showing the operation of an image sensor 100A according to some example embodiments of the inventive concepts. Referring to FIGS. 1 through 6, the image sensor 100A may include a pixel array 110A and an ADC block 125A. The image sensor 100A may operate in an image streaming mode in which pixel signals output from the pixels R, G, and B included in the image sensor 100A are binned and the binned pixel signals are transmitted to an ADC 125-1 among a plurality of ADCs 125-1 through 125-3. Six pixels may be arranged in each of rows ROW1 through ROW6 in the pixel array 110A, but the foregoing example embodiment is a non-limiting example embodiment of the inventive concepts. Each of the pixels G, B, and R may include a plurality of photodiodes, e.g., two photodiodes PD1 and PD2.

Although pixel signals output from green pixels G arranged in the odd-numbered rows ROW1, ROW3, and ROW5 of the pixel array 110A are illustrated in FIG. 6, the foregoing example embodiment is a non-limiting example embodiment of the inventive concepts. The ADC block 125A may include the first ADC 125-1, the second ADC 125-2, and the third ADC 125-3. The pixel signals respectively output from the green pixels G in the odd-numbered rows ROW1, ROW3, and ROW5 may be transmitted to the first ADC 125-1.

The first ADC 125-1 may convert the pixel signals into digital signals. The first ADC 125-1 may convert binned signals into digital signals. At this time, the second and the third ADCs 125-2 and 125-3 may be deactivated. It is assumed that the first ADC 125-1 may perform analog-to-digital conversion on pixel signals output from green pixels G in a first column, the second ADC 125-2 may perform analog-to-digital conversion on pixel signals output from green pixels G in a third column, and the third ADC 125-3 may perform analog-to-digital conversion on pixel signals output from green pixels G in a fifth column.

Figure 7:
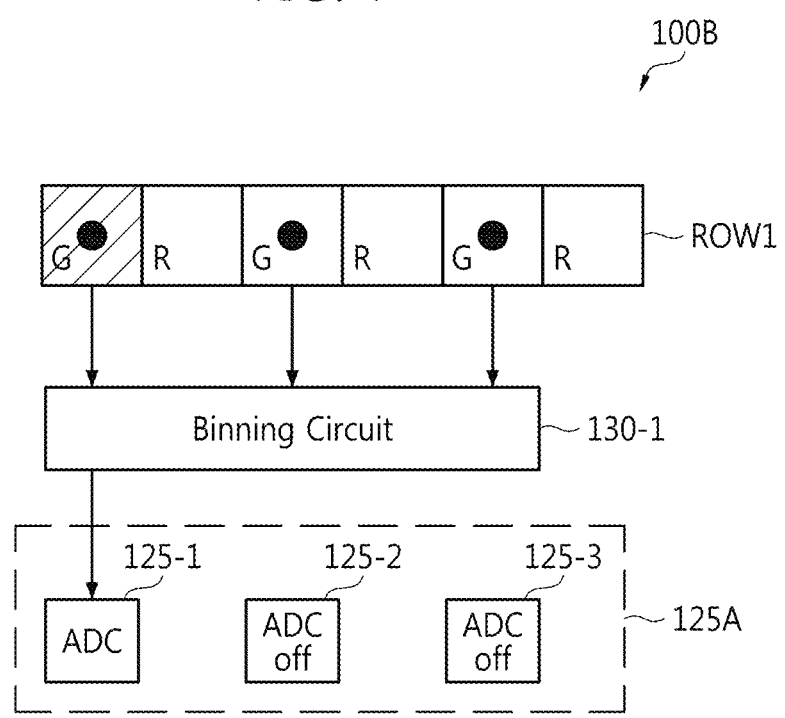
FIG. 7 is a block diagram showing the operation of pixels in a first row of the image sensor illustrated in FIG. 6.

FIG. 7 is a block diagram showing the operation of pixels G and R in the first row ROW1 of the image sensor 100A, as illustrated in FIG. 6. Referring to FIGS. 6 and 7, an image sensor 100B may include the pixels G and R in the first row ROW1, a binning circuit 130-1, and the ADC block 125A. Green pixels G and red pixels R may be arranged in the first row ROW1. Although the binning circuit 130-1 and the ADC block 125A are illustrated to explain the operation of the green pixels G in FIG. 7, this is a non-limiting example embodiment of the inventive concepts.

The green pixels G may transmit a pixel signal to the binning circuit 130-1. The binning circuit 130-1 may bin pixel signals respectively output from three green pixels G in the first row ROW1. The binning circuit 130-1 may transmit the binned pixel signals to the first ADC 125-1. The first ADC 125-1 may convert the binned pixel signals received from the binning circuit 130-1 into digital signals. At this time, only the first ADC 125-1 is activated, and the second and the third ADCs 125-2 and 125-3 are deactivated.

A method of processing the red pixels R in the first row ROW1 is the same as or similar to the method of processing the green pixels G in the first row ROW1. Thus, a detailed description of the method of processing the red pixel R will be omitted.

Figure 8:
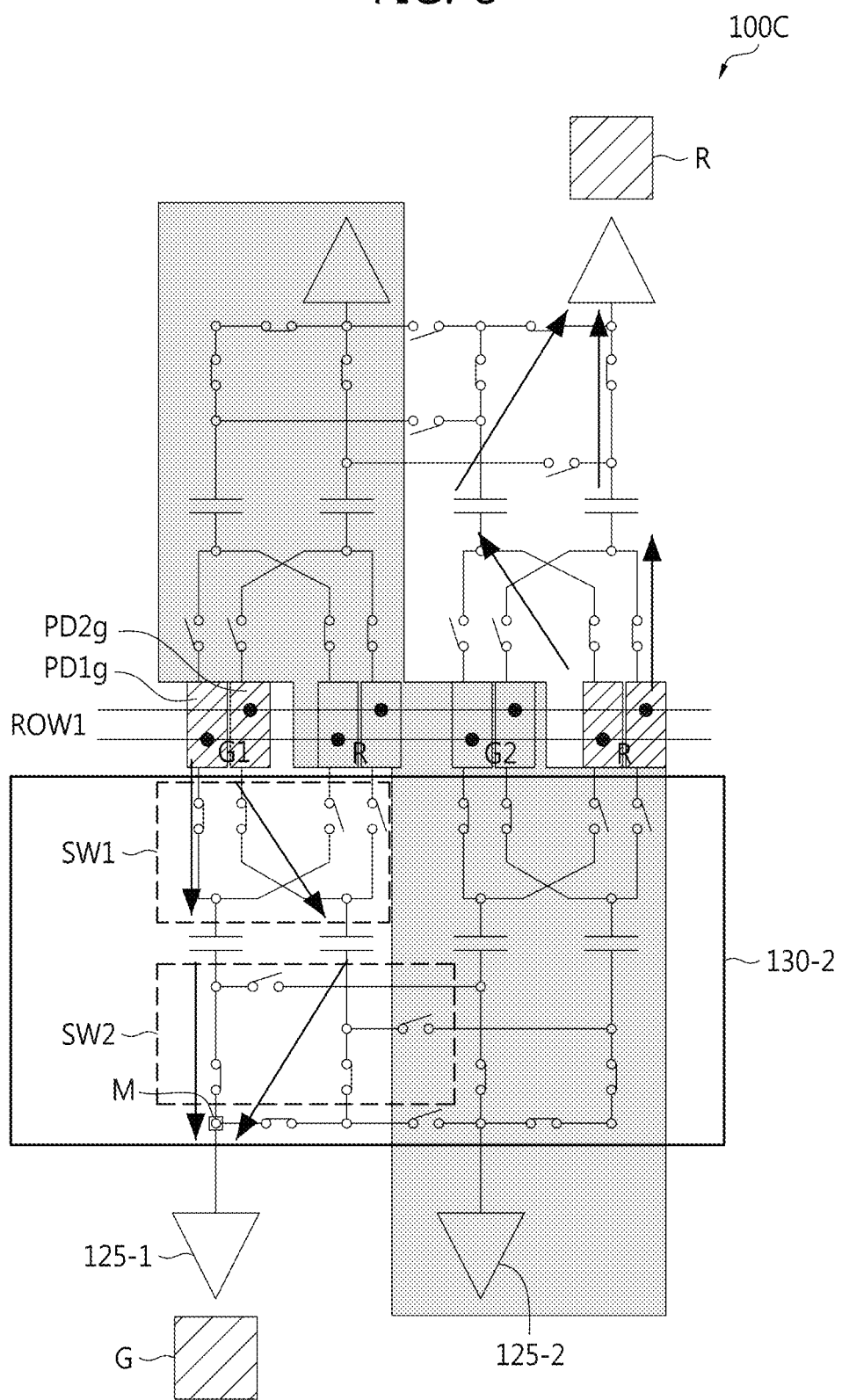
FIG. 8 is a block diagram showing the operation of pixels illustrated in FIGS. 4 and 7.

FIG. 8 is a block diagram showing the operation of pixels illustrated in FIGS. 4 and 7. Referring to FIGS. 1 through 4 and FIGS. 6 through 8, an image sensor 100C may include pixels G1, G2, and R arranged in the first row ROW1, a binning circuit 130-2, the first ADC 125-1, and the second ADC 125-2.

It is assumed that the first pixel G1 in the first row ROW1 illustrated in FIG. 8 is the same as the first pixel G in the first row ROW1 illustrated in FIG. 6, and the third pixel G2 in the first row ROW1 illustrated in FIG. 8 is the same as the third pixel G in the first row ROW1 as an example embodiment of the inventive concepts, as illustrated in FIG. 6. Four pixels G1, R, G2, and R are arranged in the first row ROW1 as a non-limiting example embodiment of the inventive concepts, as illustrated in FIG. 8. As described above, it is assumed that each of the four pixels G1, R, G2, and R includes photoelectric conversion elements, e.g., two photodiodes. In particular, the first green pixel G1 may include a first photodiode PD1g and a second photodiode PD2g.

First charges generated by the first photodiode PD1g may be transferred to the first ADC 125-1 through a first path. Second charges generated by the second photodiode PD2g may be transferred to the first ADC 125-1 through a second path different from the first path. The first charges and the second charges may be transferred to the first ADC 125-1 simultaneously, in parallel, or sequentially.

The binning circuit 130-2 may include a first switch circuit SW1 and a second switch circuit SW2. The binning circuit 130-2 may control the arrangement of the first switch circuit SW1, and the arrangement of the second switch circuit SW2 according to the control of the binning controller 155.

The first switch circuit SW1 may include first switches, and the second switch circuit SW2 may include second switches. The first path and the second path may be determined by on or off of the first switches and the second switches.

The binning circuit 130-2 may include a binning node M, which bins the first charges transferred through the first path and the second charges transferred through the second path. The binning circuit 130-2 may control the arrangement of the first switch circuit SW1 and the arrangement of the second switch circuit SW2, and transmit the first charges and the second charges to the binning node M according to the control of the binning controller 155. The binning node M may bin the first charges and the second charges, and may output a first pixel signal based on the binned charges.

When a second pixel signal output from the second green pixel G2 is transmitted to the binning node M, the binning node M may bin the first pixel signal output from the first green pixel G1 and the second pixel signal output from the second green pixel G2. At this time, the binning node M may output a binned pixel signal based on the first and second pixel signals to the first ADC 125-1. The first ADC 125-1 may convert the pixel signal binned by the binning node M into a digital signal. While the first ADC 125-1 is activated, the second ADC 125-2 may be deactivated.

A method of binning a pixel signal output from at least one red pixel R in the first row ROW1 is the same as or similar to the method of binning a pixel signal output from at least one green pixel G1 and/or G2 in the first row ROW1. Thus, a detailed description of the method will be omitted.

Figure 9:
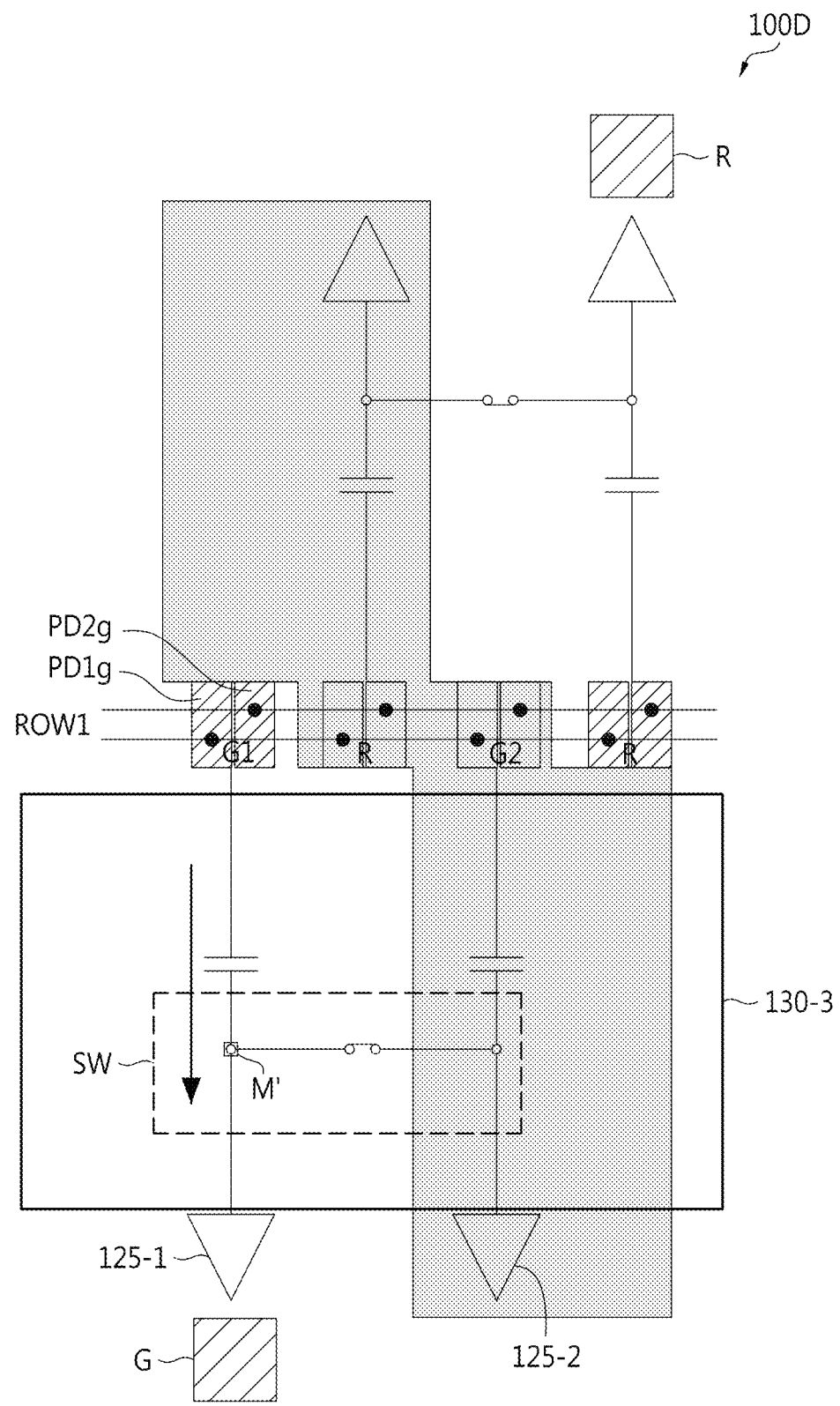
FIG. 9 is a block diagram showing the operation of pixels illustrated in FIGS. 5 and 7.

FIG. 9 is a block diagram showing the operation of pixels illustrated in FIGS. 5 and 7. Referring to FIGS. 1 through 3 and FIGS. 5 through 9, an image sensor 100D may include pixels G1, G2, and R arranged in the first row ROW1, a binning circuit 130-3, the first ADC 125-1, and the second ADC 125-2.

It is assumed that the first pixel G1 in the first row ROW1 illustrated in FIG. 9 is the same as the first pixel G in the first row ROW1 illustrated in FIG. 6, and the third pixel G2 in the first row ROW1 illustrated in FIG. 9 is the same as the third pixel G in the first row ROW1 illustrated in FIG. 6. Four pixels G1, R, G2, and R, are arranged in the first row ROW1 as a non-limiting example embodiment of the inventive concepts, as illustrated in FIG. 9. As described above, it is assumed that each of the four pixels G1, R, G2, and R includes photoelectric conversion elements, e.g., two photodiodes. In particular, the first green pixel G1 may include the first photodiode PD1g and the second photodiode PD2g.

First charges generated by the first photodiode PD1g may be transferred to the first ADC 125-1 through a third path. Second charges generated by the second photodiode PD2g may be transferred to the first ADC 125-1 through the third path. The first charges and the second charges may be sequentially transferred to the first ADC 125-1.

The binning circuit 130-3 may include a switch circuit SW. The binning circuit 130-3 may control the arrangement of the switch circuit SW according to the control of the binning controller 155. The third path may be determined by on or off of the switch circuit SW. The binning circuit 130-3 may include a binning node M' which bins the first charges and the second charges transferred through the third path. The binning circuit 130-3 may control the arrangement of the switch circuit SW and transmit the first charges and the second charges to the binning node M' according to the control of the binning controller 155. The binning node M' may bin the first charges and the second charges and may output a first pixel signal based on the binned charges.

When a second pixel signal output from the second green pixel G2 is transmitted to the binning node M', the binning node M' may bin the first pixel signal output from the first green pixel G1 and the second pixel signal output from the second green pixel G2. At this time, the binning node M' may output to the first ADC 125-1 a binned pixel signal based on the first and second pixel signals.

The first ADC 125-1 may convert the pixel signal binned by the binning node M' into a digital signal. While the first ADC 125-1 is activated, the second ADC 125-2 may be deactivated. A method of binning a pixel signal output from at least one red pixel R in the first row ROW1 is the same as or similar to the method of binning a pixel signal output from at least one green pixel G1 and/or G2 in the first row ROW1. Thus, a detailed description of the method will be omitted.

Figure 10:
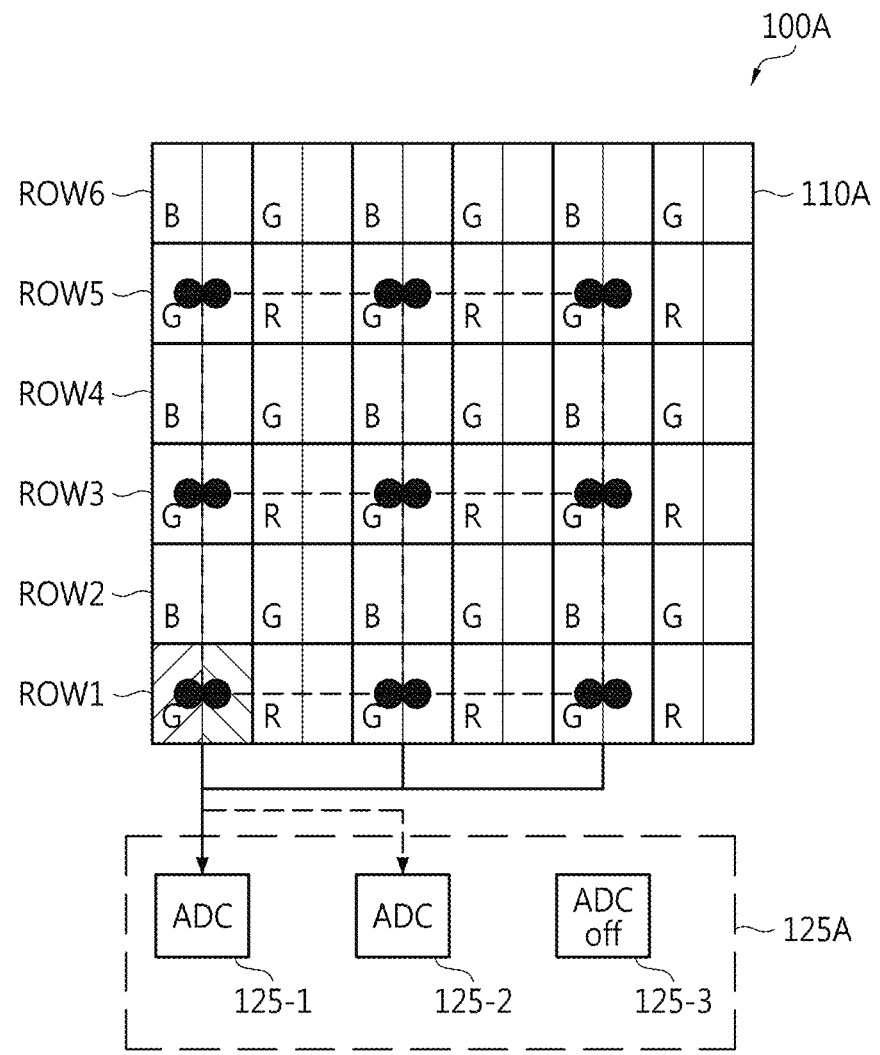
FIG. 10 is a block diagram showing the operation of an image sensor according to some example embodiments of the inventive concepts.

FIG. 10 is a block diagram showing the operation of an image sensor 100A according to other embodiments of the inventive concept. Referring to FIGS. 1 through 5 and FIG. 10, the image sensor 100A may include a pixel array 110A and an ADC block 125A. The image sensor 100A illustrated in FIG. 10 may operate in an auto-focus (AF) mode which may be for realizing phase detection auto focus or phase difference auto focus.

An exposure time or an integration time may be different among a plurality of photodiodes included in each of the pixels R, G, and B. For instance, the exposure time or the integration time of the first photodiode PD1 may be longer or short than that of the second photodiode PD2. The first photodiode PD1 may generate a long-exposure image signal and the second photodiode PD2 may generate a short-exposure image signal.

Six pixels may be arranged in each of rows ROW1 through ROW6 in the pixel array 110A, but the inventive concept is not restricted to the current embodiments. Each of the pixels G, B, and R may include a plurality of photodiodes, e.g., two photodiodes PD1 and PD2. Although pixel signals output from green pixels G arranged in the odd-numbered rows ROW1, ROW3, and ROW5 of the pixel array 110A as a non-limiting example embodiment of the inventive concepts, as illustrated in FIG. 10.

The ADC block 125A may include a first ADC 125-1, a second ADC 125-2, and a third ADC 125-3. First pixel signals respectively output from the green pixels G in the odd-numbered rows ROW1, ROW3, and ROW5 may be transmitted to the first ADC 125-1 and second pixel signals respectively output from the green pixels G may be transmitted to the second ADC 125-2.

The first ADC 125-1 may convert the first pixel signals into digital signals. The first ADC 125-1 may convert first binned pixel signals into digital signals. The second ADC 125-2 may convert the second pixel signals into digital signals. The second ADC 125-2 may convert second binned pixel signals into digital signals. At this time, the third ADC 125-3 may be deactivated. It is assumed that the first ADC 125-1 may perform analog-to-digital conversion on pixel signals output from green pixels G in a first column, the second ADC 125-2 may perform analog-to-digital conversion on pixel signals output from green pixels G in a third column, and the third ADC 125-3 may perform analog-to-digital conversion on pixel signals output from green pixels G in a fifth column.

Figure 11:
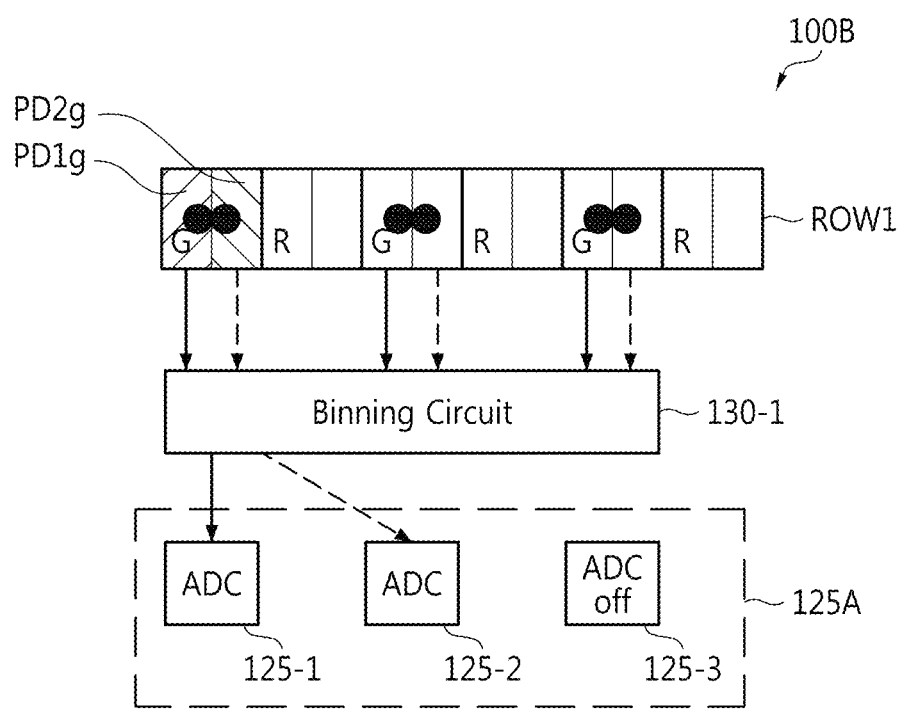
FIG. 11 is a block diagram showing the operation of pixels in a first row of the image sensor illustrated in FIG. 10.

FIG. 11 is a block diagram showing the operation of pixels G and R in the first row ROW1 of the image sensor 100A illustrated in FIG. 10. Referring to FIGS. 10 and 11, an image sensor 100B may include the pixels G and R in the first row ROW1, a binning circuit 130-1, and the ADC block 125A. Green pixels G and red pixels R may be arranged in the first row ROW1. Although the binning circuit 130-1 and the ADC block 125A are illustrated to explain the operation of the green pixels G in FIG. 11, this is just a non-limiting example embodiment.

The green pixels G may transmit a pixel signal to the binning circuit 130-1. The binning circuit 130-1 may bin first pixel signals respectively output from three green pixels G in the first row ROW1 and may bin second pixel signals respectively output from three green pixels G in the first row ROW1.

The binning circuit 130-1 may transmit the first binned pixel signals to the first ADC 125-1. The first ADC 125-1 may convert the first binned pixel signals received from the binning circuit 130-1 into digital signals. The binning circuit 130-1 may also transmit the second binned pixel signals to the second ADC 125-2. The second ADC 125-2 may convert the second binned pixel signals received from the binning circuit 130-1 into digital signals. At this time, the first ADC 125-1 and the second ADC 125-2 are activated and the third ADC 125-3 is deactivated.

A method of processing the red pixels R in the first row ROW1 is the same as or similar to the method of processing the green pixels G in the first row ROW1. Thus, a detailed description of the method of processing the red pixel R will be omitted.

Figure 12:
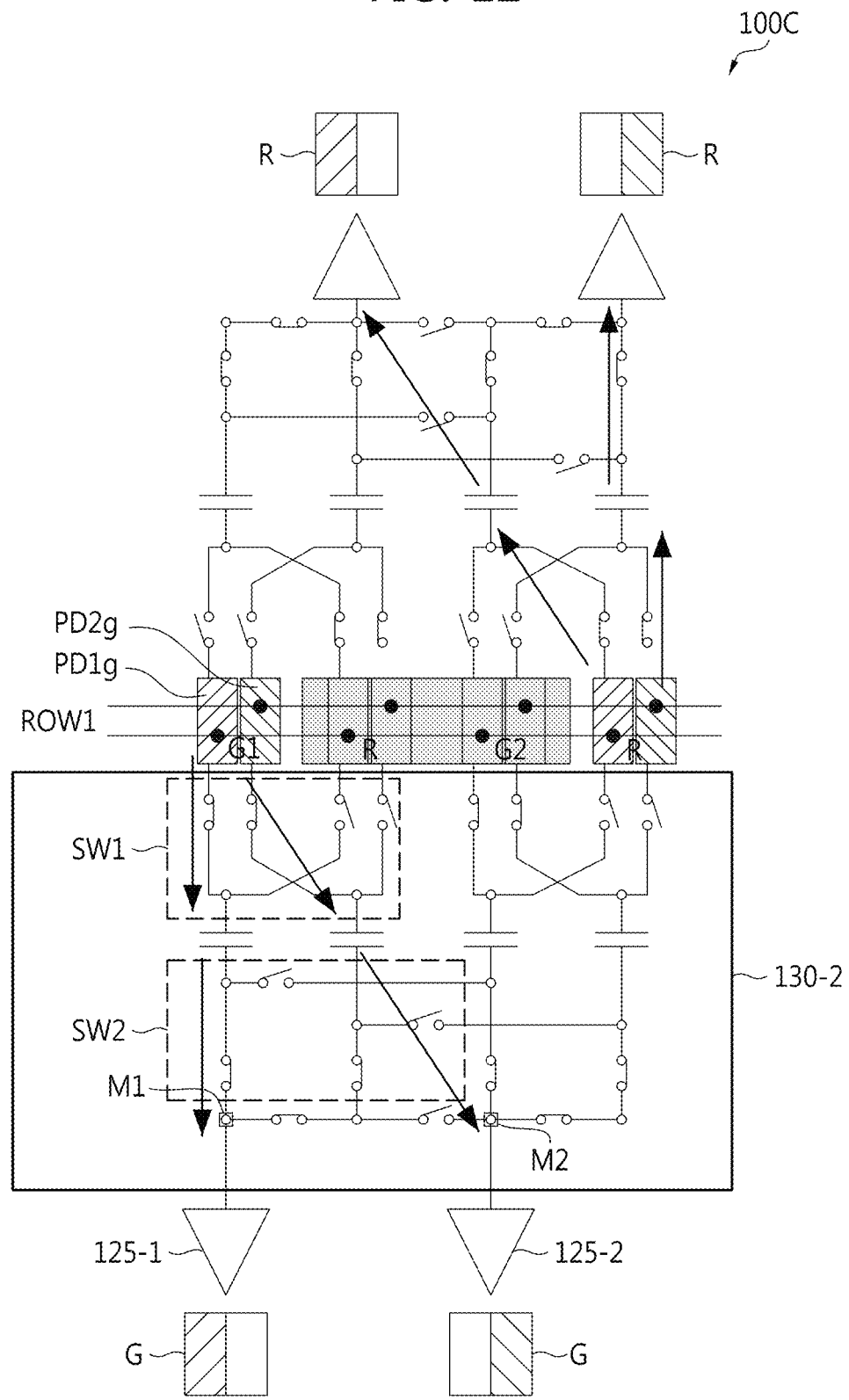
FIG. 12 is a block diagram showing the operation of pixels illustrated in FIGS. 4 and 11.

FIG. 12 is a block diagram showing the operation of pixels illustrated in FIGS. 4 and 11. Referring to FIGS. 1 through 4 and FIGS. 10 through 12, an image sensor 100C may include pixels G1, G2, and R arranged in the first row ROW1, a binning circuit 130-2, the first ADC 125-1, and the second ADC 125-2.

It is assumed that the first pixel G1 in the first row ROW1 illustrated in FIG. 12 is the same as the first pixel G in the first row ROW1 illustrated in FIG. 10, and the third pixel G2 in the first row ROW1 illustrated in FIG. 12 is the same as the third pixel G in the first row ROW1 illustrated in FIG. 10. Four pixels G1, R, G2, and R, are arranged in the first row ROW1 as a non-limiting example embodiment of the inventive concepts, as illustrated in FIG. 12. As described above, it is assumed that each of the four pixels G1, R, G2, and R includes photoelectric conversion elements, e.g., two photodiodes. In particular, the first green pixel G1 may include a first photodiode PD1g and a second photodiode PD2g.

First charges generated by the first photodiode PD1g may be transferred to the first ADC 125-1 through a first path. Second charges generated by the second photodiode PD2g may be transferred to the second ADC 125-2 through a second path different from the first path. The first charges and the second charges may be transferred to the first ADC 125-1 and the second ADC 125-2 simultaneously, in parallel, or sequentially.

The binning circuit 130-2 may include a first switch circuit SW1 and a second switch circuit SW2. The binning circuit 130-2 may control the arrangement of the first switch circuit SW1 and the arrangement of the second switch circuit SW2 according to the control of the binning controller 155.

The first switch circuit SW1 may include first switches and the second switch circuit SW2 may include second switches. The first path and the second path may be determined by on or off of the first switches and the second switches.

The binning circuit 130-2 may include a first binning node M1 which bins the first charges transferred through the first path and a second binning node M2 which bins the second charges transferred through the second path. The binning circuit 130-2 may control the arrangement of the first switch circuit SW1 and the arrangement of the second switch circuit SW2 and transmit the first charges to the first binning node M1 and the second charges to the second binning node M2 according to the control of the binning controller 155.

When third charges output from the second green pixel G2 are transmitted to the first binning node M1, the first binning node M1 may bin the first charges output from the first green pixel G1 and the third charges output from the second green pixel G2. At this time, the first binning node M1 may output to the first ADC 125-1 a first binned pixel signal based on the first charges and the third charges. In addition, when fourth charges output from the second green pixel G2 are transmitted to the second binning node M2, the second binning node M2 may bin the second charges output from the first green pixel G1 and the fourth charges output from the second green pixel G2. At this time, the second binning node M2 may output to the second ADC 125-2 a second binned pixel signal based on the second charges and the fourth charges.

The first ADC 125-1 may convert the first binned pixel signal received from the first binning node M1 into a digital signal. The second ADC 125-2 may convert the second binned pixel signal received from the second binning node M2 into a digital signal.

A method of binning a pixel signal output from at least one red pixel R in the first row ROW1 is the same as or similar to the method of binning a pixel signal output from at least one green pixel G1 and/or G2 in the first row ROW1. Thus, a detailed description of the method will be omitted.

Figures 13A, 13B:
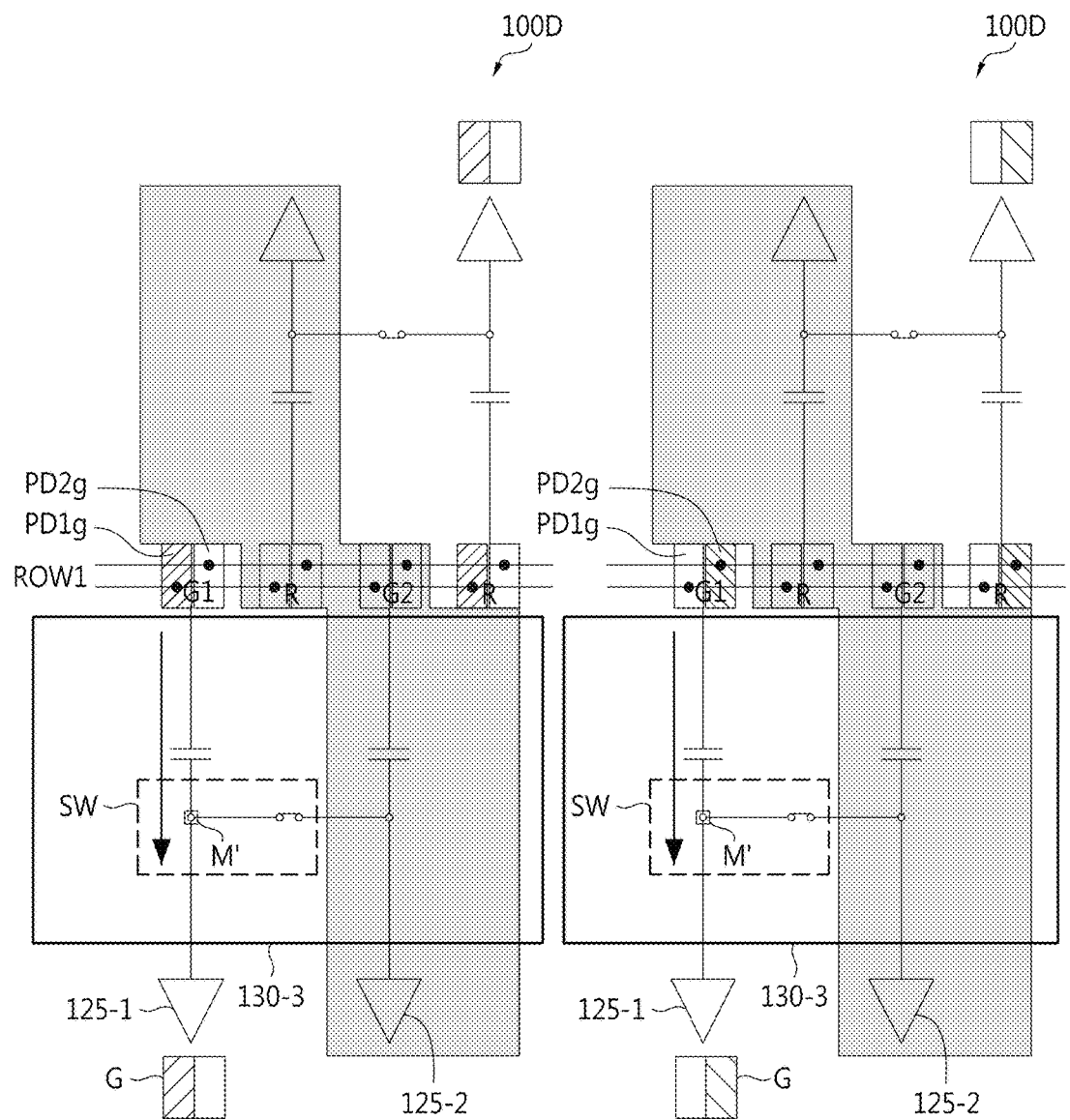
FIGS. 13A and 13B are a block diagram showing the operation of pixels illustrated in FIGS. 5 and 11.

FIGS. 13A and 13B are a block diagram showing the operation of pixels illustrated in FIGS. 5 and 11. Referring to FIGS. 1 through 3, FIG. 5, and FIGS. 10 through 13, an image sensor 100D may include pixels G1, G2, and R arranged in the first row ROW1, a binning circuit 130-3, the first ADC 125-1, and the second ADC 125-2.

It is assumed that the first pixel G1 in the first row ROW1 illustrated in FIGS. 13A and 13B are the same as the first pixel G in the first row ROW1 illustrated in FIG. 10, and the third pixel G2 in the first row ROW1 illustrated in FIGS. 13A and 13B are the same as the third pixel G in the first row ROW1 illustrated in FIG. 10. Four pixels G1, R, G2, and R, are arranged in the first row ROW1 as a non-limiting example embodiment of the inventive concepts, as illustrated in FIGS. 13A and 13B. As described above, it is assumed that each of the four pixels G1, R, G2, and R includes photoelectric conversion elements, e.g., two photodiodes. In particular, the first green pixel G1 may include the first photodiode PD1g and the second photodiode PD2g. FIG. 13A, in particular, shows an operation of the image sensor 100D outputting a first pixel signal and FIG. 13B, in particular, shows an operation of the image sensor 100D outputting a second pixel signal.

The first pixel signal may be transmitted to the first ADC 125-1 through a third path based on first charges generated by the first photodiode PD1gThe second pixel signal may be transmitted to the first ADC 125-1 through the third path based on second charges generated by the second photodiode PD2g. The first pixel signal and the second pixel signal may be sequentially transmitted to the first ADC 125-1.

The binning circuit 130-3 may include a switch circuit SW. The binning circuit 130-3 may control the arrangement of the switch circuit SW according to the control of the binning controller 155. The third path may be determined by on or off of the switch circuit SW. The binning circuit 130-3 may include a binning node M' which bins pixel signals output from the first green pixel G1 and pixel signals output from the second green pixel G2.

The binning circuit 130-3 may control the arrangement of the switch circuit SW and transmit the first pixel signal and the second pixel signal to the binning node M' according to the control of the binning controller 155. The first pixel signal and the second pixel signal may be sequentially transmitted to the binning node M'.

When a third pixel signal output from a third photodiode of the second green pixel G2 is transmitted to the binning node M', the binning node M' may bin the first pixel signal output from the first green pixel G1 and the third pixel signal output from the second green pixel G2. At this time, the binning node M' may output to the first ADC 125-1 a first binned pixel signal based on the first and third pixel signals. In addition, when a fourth pixel signal output from a fourth photodiode of the second green pixel G2 is transmitted to the binning node M', the binning node M' may bin the second pixel signal output from the first green pixel G1 and the fourth pixel signal output from the second green pixel G2. At this time, the binning node M' may output to the first ADC 125-1 a second binned pixel signal based on the second and fourth pixel signals.

The first ADC 125-1 may sequentially convert the first and the second binned pixel signals received from the binning node M' into digital signals. While the first ADC 125-1 is activated, the second ADC 125-2 may be deactivated. A method of binning a pixel signal output from at least one red pixel R in the first row ROW1 is the same as or similar to the method of binning a pixel signal output from at least one green pixel G1 and/or G2 in the first row ROW1. Thus, a detailed description of the method will be omitted.

Figure 14:
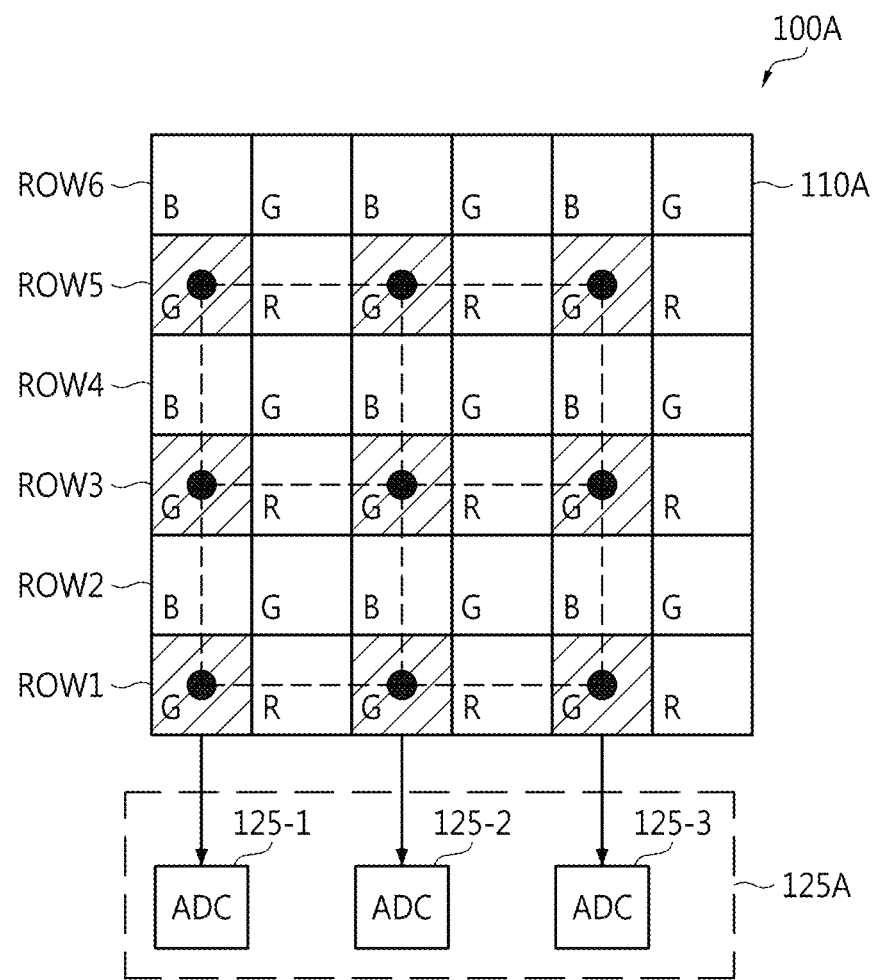
FIG. 14 is a block diagram showing the operation of an image sensor according to some example embodiments of the inventive concepts.

FIG. 14 is a block diagram showing the operation of the image sensor 100A according to some example embodiments of the inventive concepts. Referring to FIGS. 1 through 14, the image sensor 100A may include the pixel array 110A and the ADC block 125A. The image sensor 100A illustrated in FIG. 14 may operate in a still shot mode in which the image sensor 100 activates all ADCs, and allow pixel signals output from some or all pixels included in the pixel array 110 to be transmitted to the ADCs to output image data.

Six pixels may be arranged in each of the rows ROW1 through ROW6 in the pixel array 110A, but the inventive concepts is not restricted to the current example embodiments. Each of the pixels G, B, and R may include a plurality of photodiodes, e.g., two photodiodes PD1 and PD2. Although pixel signals output from green pixels G arranged in the odd-numbered rows ROW1, ROW3, and ROW5 of the pixel array 110A are illustrated in FIG. 14, the inventive concept is not restricted to the current example embodiments.

The ADC block 125A may include the first ADC 125-1, the second ADC 125-2, and the third ADC 125-3. The pixel signals respectively output from the green pixels G in the odd-numbered rows ROW1, ROW3, and ROW5 may be transmitted to the first through third ADCs 125-1, 125-2, and 125-3.

The first ADC 125-1 may convert first pixel signals output from a first column of the pixel array 110A into digital signals. The first ADC 125-1 may convert first binned signals into digital signals. The second ADC 125-2 may convert second pixel signals output from a third column of the pixel array 110A into digital signals. The second ADC 125-2 may convert second binned signals into digital signals. The third ADC 125-3 may convert third pixel signals output from a fifth column of the pixel array 110A into digital signals. The third ADC 125-3 may convert third binned signals into digital signals. It is assumed that the first ADC 125-1 may perform analog-to-digital conversion on pixel signals output from green pixels G in the first column, the second ADC 125-2 may perform analog-to-digital conversion on pixel signals output from green pixels G in the third column, and the third ADC 125-3 may perform analog-to-digital conversion on pixel signals output from green pixels G in the fifth column.

Figure 15:
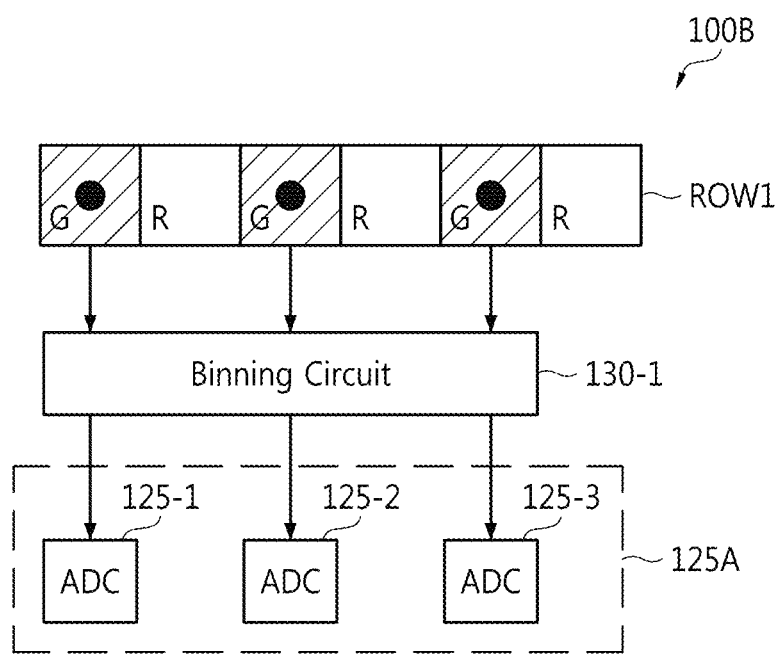
FIG. 15 is a block diagram showing the operation of pixels in a first row of the image sensor illustrated in FIG. 14.

FIG. 15 is a block diagram showing the operation of pixels G and R in the first row ROW1 of the image sensor 100A illustrated in FIG. 14. Referring to FIGS. 14 and 15, the image sensor 100B may include the pixels G and R in the first row ROW1, the binning circuit 130-1, and the ADC block 125A. Green pixels G and red pixels R may be arranged in the first row ROW1. Although the binning circuit 130-1 and the ADC block 125A are illustrated to explain the operation of the green pixels G in FIG. 15, this is a non-limiting example embodiment of the inventive concepts.

The green pixels G may transmit a pixel signal to the binning circuit 130-1. The binning circuit 130-1 may bin pixel signals respectively output from three green pixels G in the first row ROW1. The binning circuit 130-1 may transmit the binned pixel signals to the first through third ADCs 125-1, 125-2, and 125-3. The first ADC 125-1 may convert the first binned pixel signals received from the binning circuit 130-1 into digital signals. The second ADC 125-2 may convert the second binned pixel signals received from the binning circuit 130-1 into digital signals. The third ADC 125-3 may convert the third binned pixel signals received from the binning circuit 130-1 into digital signals.

A method of processing the red pixels R in the first row ROW1 is the same as or similar to the method of processing the green pixels G in the first row ROW1. Thus, a detailed description of the method of processing the red pixel R will be omitted.

Figure 16:
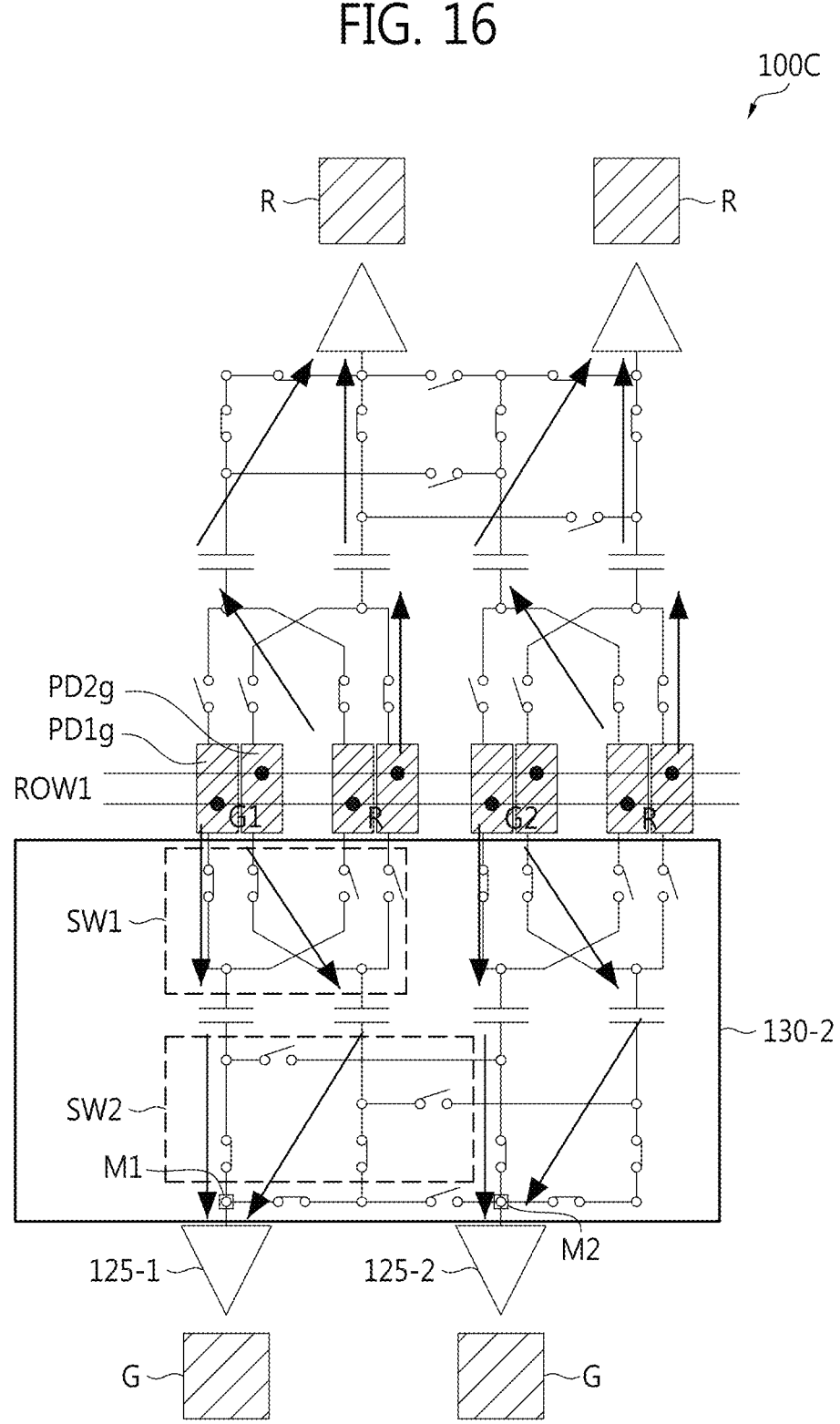
FIG. 16 is a block diagram showing the operation of pixels illustrated in FIGS. 4 and 15.

FIG. 16 is a block diagram showing the operation of pixels illustrated in FIGS. 4 and 14. Referring to FIGS. 1 through 4 and FIGS. 14 through 16, the image sensor 100C may include pixels G1, G2, and R arranged in the first row ROW1, the binning circuit 130-2, the first ADC 125-1, and the second ADC 125-2.

It is assumed that the first pixel G1 in the first row ROW1 illustrated in FIG. 16 is the same as the first pixel G in the first row ROW1 illustrated in FIG. 14 and the third pixel G2 in the first row ROW1 illustrated in FIG. 16 is the same as the third pixel G in the first row ROW1 illustrated in FIG. 14. Four pixels G1, R, G2, and R, are arranged in the first row ROW1 as a non-limiting example embodiment of the inventive concepts, as illustrated in FIG. 16. As described above, it is assumed that each of the four pixels G1, R, G2, and R includes photoelectric conversion elements, e.g., two photodiodes. In particular, the first green pixel G1 may include the first photodiode PD1g and the second photodiode PD2g.

First charges generated by the first photodiode PD1g may be transferred to the first ADC 125-1 through a first path. Second charges generated by the second photodiode PD2g may be transferred to the first ADC 125-1 through a second path different from the first path. The first charges and the second charges may be transferred to the first ADC 125-1 simultaneously, in parallel, or sequentially.

The binning circuit 130-2 may include the first switch circuit SW1 and the second switch circuit SW2. The binning circuit 130-2 may control the arrangement of the first switch circuit SW1 and the arrangement of the second switch circuit SW2 according to the control of the binning controller 155.

The first switch circuit SW1 may include first switches and the second switch circuit SW2 may include second switches. The first path and the second path may be determined by on or off of the first switches and the second switches.

The binning circuit 130-2 may include the first binning node M1 which bins the first charges transferred through the first path and the second charges transferred through the second path. The binning circuit 130-2 may control the arrangement of the first switch circuit SW1 and the arrangement of the second switch circuit SW2 and transmit the first charges and the second charges to the first binning node M1 according to the control of the binning controller 155. The first binning node M1 may bin the first charges and the second charges and may output a first pixel signal based on the binned charges.

A method of binning a second pixel signal output from the second green pixel G2 in the first row ROW1 may be the same as or similar to the method of binning the first pixel signal output from the first green pixel G1 in the first row ROW1. When third charges output from a third photodiode of the second green pixel G2 and fourth charges output from a fourth photodiode of the second green pixel G2 are transmitted to the second binning node M2, the second binning node M2 may bin the third charges and the fourth charges. At this time, the second binning node M2 may output the second pixel signal based on the binned charges to the second ADC 125-2.

The first ADC 125-1 may convert the first pixel signal binned by the first binning node M1 into a digital signal. The second ADC 125-2 may convert the second pixel signal binned by the second binning node M2 into a digital signal.

A method of binning a pixel signal output from at least one red pixel R in the first row ROW1 is the same as or similar to the method of binning a pixel signal output from at least one green pixel G1 and/or G2 in the first row ROW1. Thus, a detailed description of the method will be omitted.

Figure 17:
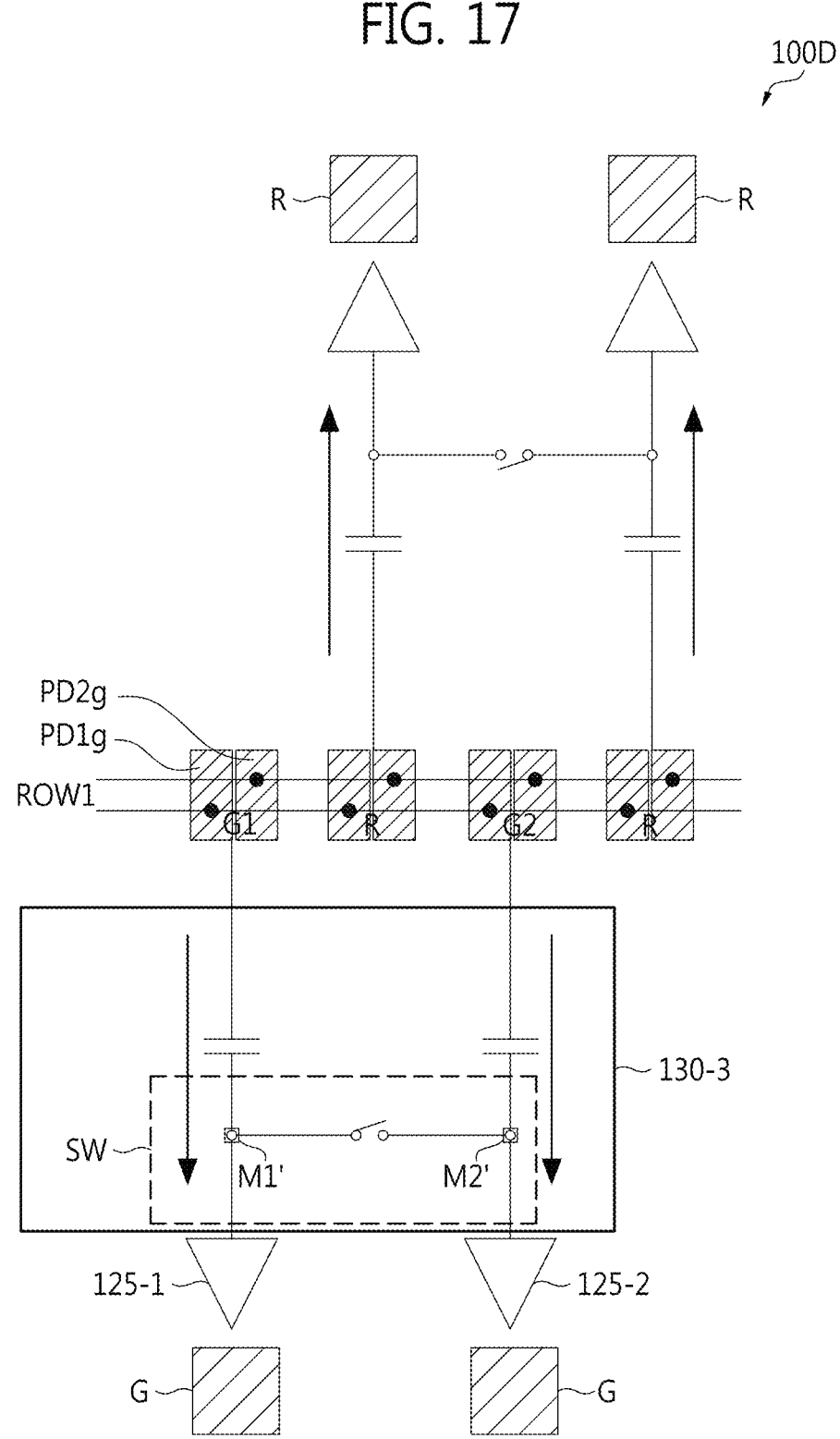
FIG. 17 is a block diagram showing the operation of pixels illustrated in FIGS. 5 and 15.

FIG. 17 is a block diagram showing the operation of pixels illustrated in FIGS. 5 and 14. Referring to FIGS. 1 through 3 and FIGS. 5 through 17, the image sensor 100D may include pixels G1, G2, and R arranged in the first row ROW1, the binning circuit 130-3, the first ADC 125-1, and the second ADC 125-2.

It is assumed that the first pixel G1 in the first row ROW1 illustrated in FIG. 17 is the same as the first pixel G in the first row ROW1 illustrated in FIG. 14 and the third pixel G2 in the first row ROW1 illustrated in FIG. 17 is the same as the third pixel G in the first row ROW1 illustrated in FIG. 14. Four pixels G1, R, G2, and R, are arranged in the first row ROW1, as a non-limiting example embodiment of the inventive concepts, as illustrated in FIG. 17. As described above, it is assumed that each of the four pixels G1, R, G2, and R includes photoelectric conversion elements, e.g., two photodiodes. In particular, the first green pixel G1 may include the first photodiode PD1g and the second photodiode PD2g.

First charges generated by the first photodiode PD1g may be transferred to the first ADC 125-1 through a third path. Second charges generated by the second photodiode PD2g may be transferred to the first ADC 125-1 through the third path. The first charges and the second charges may be sequentially transferred to the first ADC 125-1.

The binning circuit 130-3 may include the switch circuit SW. The binning circuit 130-3 may control the arrangement of the switch circuit SW according to the control of the binning controller 155. The third path may be determined by on or off of the switch circuit SW.

The binning circuit 130-3 may include a third binning node M1' which bins the first charges and the second charges transferred through the third path. The binning circuit 130-3 may control the arrangement of the switch circuit SW and transmit the first charges and the second charges to the third binning node M1' according to the control of the binning controller 155. The third binning node M1' may bin the first charges and the second charges and may output a first pixel signal based on the binned charges.

When third charges output from a third photodiode of the second green pixel G2 and fourth charges output from a fourth photodiode of the second green pixel G2 are transmitted to a fourth binning node M2', the fourth binning node M2' may bin the third charges and the fourth charges. At this time, the fourth binning node M2' may output to the second ADC 125-2 a second pixel signal based on the binned charges.

The first ADC 125-1 may convert the first pixel signal binned by the third binning node M1' into a digital signal. The second ADC 125-2 may convert the second pixel signal binned by the fourth binning node M2' into a digital signal. A method of binning a pixel signal output from at least one red pixel R in the first row ROW1 is the same as or similar to the method of binning a pixel signal output from at least one green pixel G1 and/or G2 in the first row ROW1. Thus, a detailed description of the method will be omitted.

Figure 18:
FIG. 18 is a block diagram showing the operation of an image processing system including an image sensor according to some example embodiments of the inventive concepts.

FIG. 18 is a block diagram showing the operation of the image processing system 10 including the image sensor 100 according to some example embodiments of the inventive concepts. Referring to FIGS. 1 through 18, the image processing system 10 includes the image sensor 100 and the DSP 200, and is substantially the same as the image processing system 10 described with reference to FIG. 1.

The DSP 200 may control the image sensor 100. The DSP 200 may operate as a controller of the image sensor 100. The DSP 200 may control the image sensor 100 to output the image data IDATA.

The image sensor 100 may output a live-view frame LV in an image streaming mode. The image sensor 100 may output AF frames AF1 through AF3 in an AF mode. The image sensor 100 may output image frames Frame( ) through Frame3 in a still shot mode.

The image sensor 100 may output the AF frames AF1 through AF3 prior to the image frames Frame1 through Frame3, respectively according to the control of the DSP 200. In other words, the image sensor 100 may output the first AF frame AF1 prior to the first frame Frame1, the second AF frame AF2 prior to the second frame Frame2, and the third AF frame AF3 prior to the third frame Frame3.

The image sensor 100 may sequentially output the image frames Frame1 through Frame3 and the AF frames AF1 through AF3. The image sensor 100 may skip the outputting of the AF frame AF2 between the first frame Frame1 and the second frame Frame2 according to the control of the DSP 200. The image sensor 100 may output the second AF frame AF2 between the second frame Frame2 and the third frame Frame3.

Figure 19:
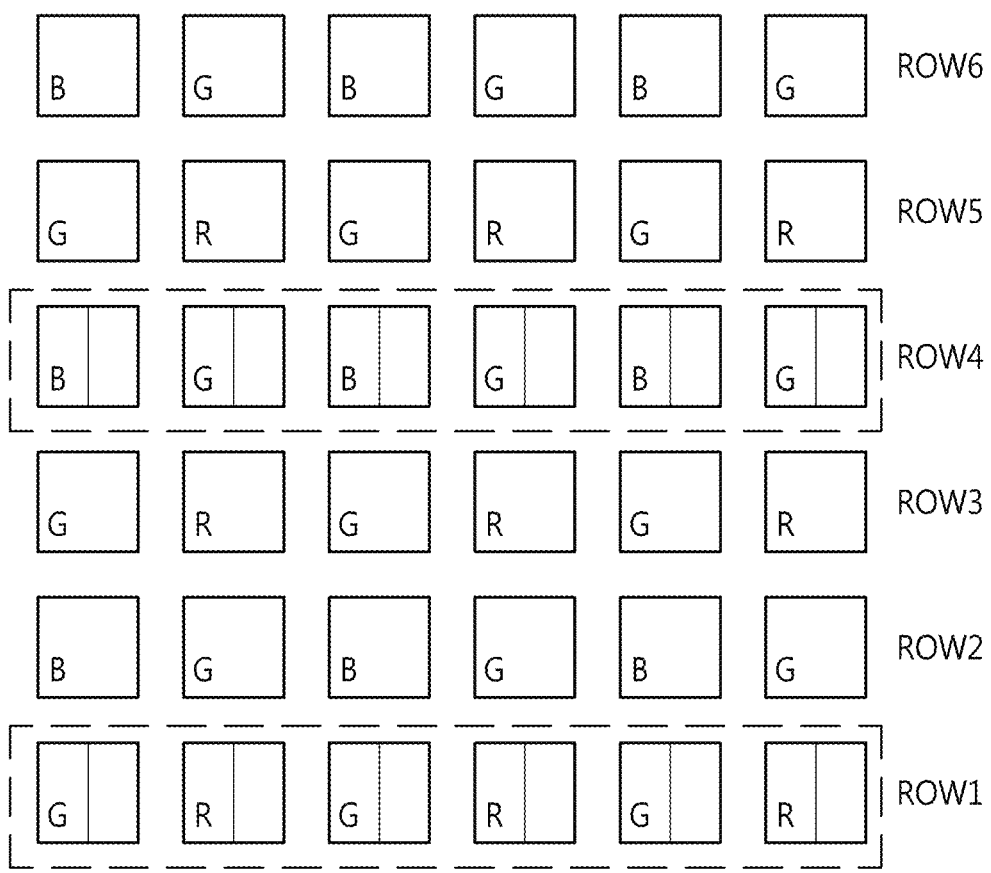
FIG. 19 is a block diagram showing the operation of an image processing system including an image sensor according to some example embodiments of the inventive concepts.

FIG. 19 is a block diagram showing the operation of the image processing system 10 including the image sensor 100 according to some example embodiments of the inventive concepts. Referring to FIGS. 1 through 19, a pixel array 110E may be a part of the pixel array 110 as illustrated in FIG. 1.

The DSP 200 may control readout of pixel signals output from pixels arranged in each row of the pixel array 110E. The pixel array 110E may include first pixels arranged in first rows ROW1 and ROW4 and second pixels arranged in second rows ROW2, ROW3, ROW5, and ROW6. The first pixels may be pixels that are used for AF.

The DSP 200 may control the image sensor 100 to read out pixel signals output from the first pixels and skip readout of pixel signals output from the second pixels in the AF mode. The DSP 200 may also control the image sensor 100 to read out all pixel signals output from the first and second pixels in the still shot mode.

Figure 20:
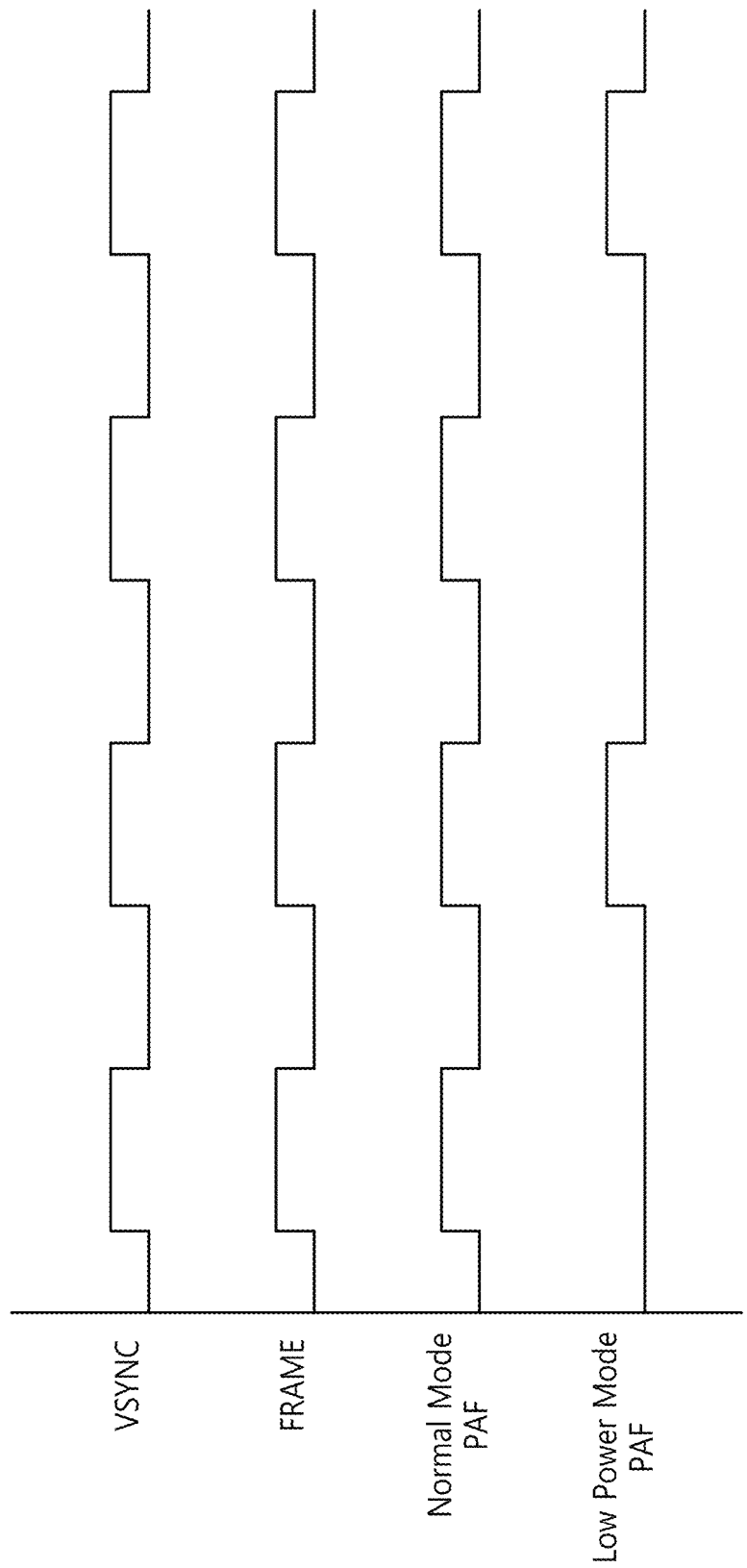
FIG. 20 is a timing chart of image data output from an image sensor according to some example embodiments of the inventive concepts.

FIG. 20 is a timing chart of image data output from the image sensor 100 according to some example embodiments of the inventive concepts. Referring to FIGS. 1 through 20, the DSP 200 may control the frame rate of the image data IDATA output from the image sensor 100. When the image sensor 100 outputs PAF data PAF, the DSP 200 may control the frame rate of the image data IDATA output from the image sensor 100. The PAF data PAF is the image data IDATA that the image sensor 100 outputs in the AF mode.

The image sensor 100 may output an image frame FRAME according to a sync signal SYNC. The image frame FRAME is the image data IDATA that the image sensor 100 outputs in the live-view mode or the still shot mode. The image sensor 100 may transmit the PAF data PAF at a frame rate equal to or lower than that of the image frame FRAME.

The DSP 200 may drive the image sensor 100 in a normal mode or a low power mode. The image sensor 100 may output the image data PAF or IDATA at a frame rate equal to that of the sync signal SYNC in the normal mode. The image sensor 100 may output the image data PAF or IDATA at a frame rate lower than, e.g., half of, that used in the normal mode in the low power mode. Since the image sensor 100 outputs less PAF data PAF in the low power mode than in the normal mode, the power consumption of the image sensor 100 is minimized in the low power mode.

Figure 21:
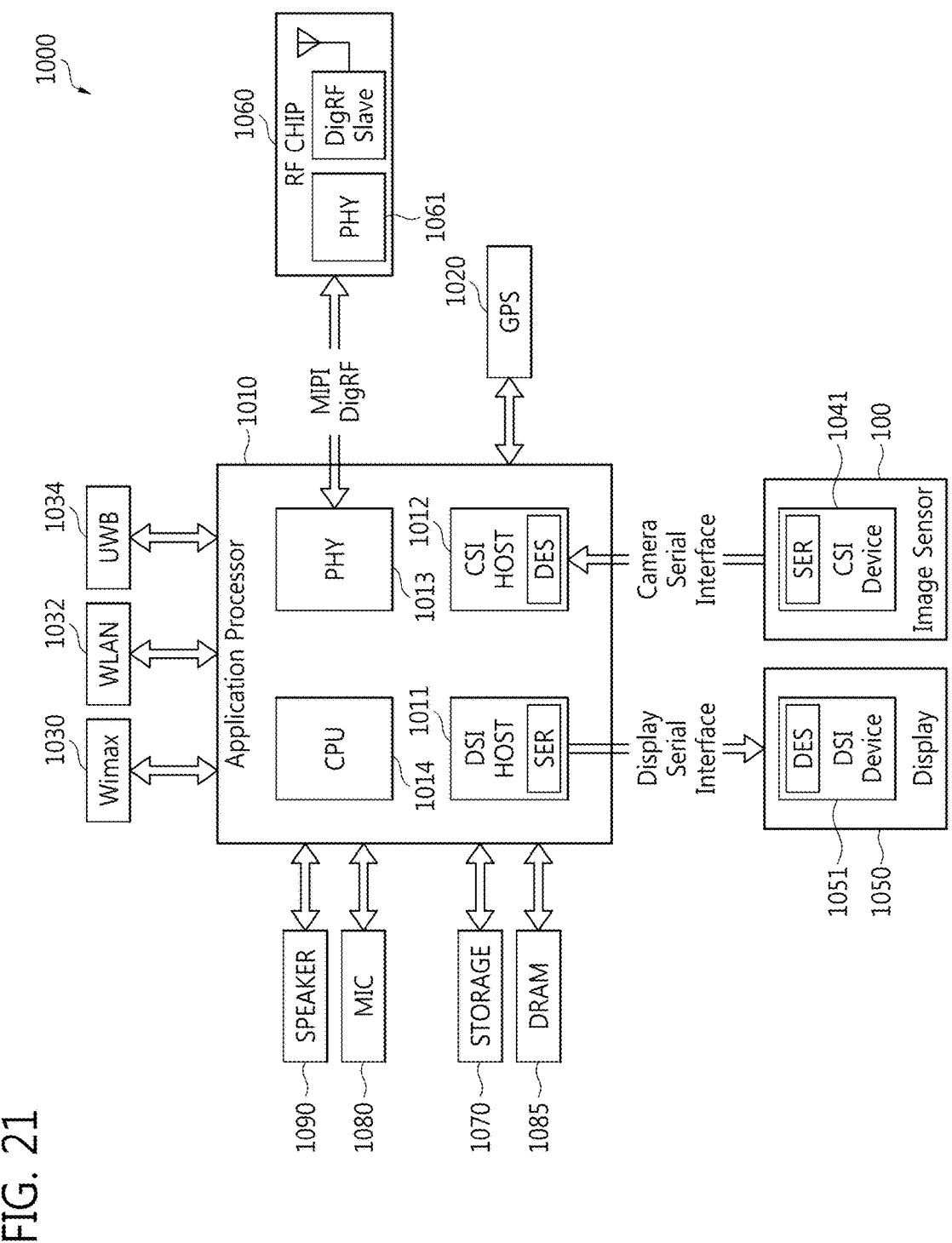
FIG. 21 is a block diagram of an electronic system including an image sensor illustrated in FIG. 1 according to some example embodiments of the inventive concept.

FIG. 21 is a block diagram of an electronic system 1000 including the image sensor 100 illustrated in FIG. 1 according to some example embodiments of the inventive concepts. Referring to FIGS. 1 through 21, the electronic system 1000 may be implemented as an image processing system that can use or support mobile industry processor interface (MIPI). The image processing system 1000 may be, including but not limited to, a laptop computer, a cellular phone, a smart phone, a tablet PC, a PDA, an EDA, a digital still camera, a digital video camera, a PMP, a MID, a wearable computer, an IoT device, or an IoE device. The electronic system 1000 includes an application processor 1010, the image sensor 100, and a display 1050.

A camera serial interface (CSI) host 1012 in the application processor 1010 may perform serial communication with a CSI device 1041 in the image sensor 100 through CSI. A deserializer DES and a serializer SER may be included in the CSI host 1012 and the CSI device 1041, respectively.

A display serial interface (DSI) host 1011 in the application processor 1010 may perform serial communication with a DSI device 1051 in the display 1050 through DSI. A serializer SER and a deserializer DES may be included in the DSI host 1011 and the DSI device 1051, respectively. The image data IDATA output from the image sensor 100 may be transmitted to the application processor 1010 through CSI. The application processor 1010 may process the image data IDATA and may transmit processed image data to the display 1050 through DSI.

The electronic system 1000 may also include a radio frequency (RF) chip 1060 communicating with the application processor 1010. A physical layer (PHY) 1013 in the application processor 1010 and a PHY 1061 in the RF chip 1060 may communicate data with each other according to MIPI DigRF.

A central processing unit (CPU) 1014 in the application processor 1010 may control the operations of the DSI host 1011, the CSI host 1012, and the PHY 1013. The CPU 1014 may include at least one core. The application processor 1010 may be implemented in an integrated circuit (IC) or a system on chip (SoC). The application processor 1010 may be a processor or a host that can control the operations of the image sensor 100.

The electronic system 1000 may further include a global positioning system (GPS) receiver 1020, a volatile memory 1085 such as dynamic random access memory (DRAM), a data storage 1070 formed using non-volatile memory such as flash-based memory, a microphone (MIC) 1080, and/or a speaker 1090. The data storage 1070 may be implemented as an external memory detachable from the application processor 1010. The data storage 1070 may also be implemented as a universal flash storage (UFS), a multimedia card (MMC), an embedded MMC (eMMC), or a memory card. The electronic system 1000 may communicate with external devices using at least one communication protocol or standard, e.g., ultra-wideband (UWB) 1034, wireless local area network (WLAN) 1132, worldwide interoperability for microwave access (Wimax) 1030, or long term evolution (LTETM) (not shown). In some example embodiments of the inventive concepts, the electronic system 1000 may also include, but not limited to, a near field communication (NFC) module, a WiFi module, or a Bluetooth module.

Figure 22:
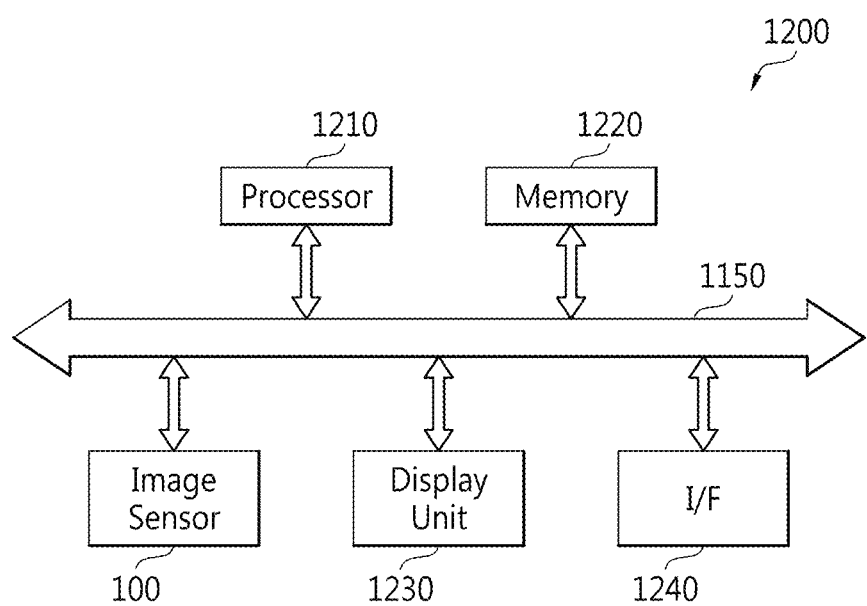
FIG. 22 is a block diagram of an electronic system including the image sensor illustrated in FIG. 1 according to some example embodiments of the inventive concepts.

FIG. 22 is a block diagram of an electronic system 1200 including the image sensor 100 illustrated in FIG. 1 according to some example embodiments of the inventive concepts. Referring to FIGS. 1 through 22, the electronic system 1200 may include the image sensor 100, a processor 1210, a memory 1220, a display unit 1230, and an OF 1240. The image sensor 100, the processor 1210, the memory 1220, the display unit 1230, and an I/F 1240 may transmit or receive data through a channel 1150.

The processor 1210 may control the operation of the image sensor 100. The processor 1210 may process pixel signals output from the image sensor 100 and generate image data.

The memory 1220 may store a program for controlling the operation of the image sensor 100 and may store image data generated by the processor 1210. The processor 1210 may execute the program stored in the memory 1220. The memory 1220 may be formed of volatile or non-volatile memory.

The display unit 1230 may display the image data output from the processor 1210 or the memory 1220. The OF 1240 may be formed to input and output image data. The OF 1240 may be implemented as a wireless interface.

As described above, according to some example embodiments of the inventive concepts, an image sensor has a 1-microlens multi-photodiode structure and includes an ADC there within, so that the power consumption of the image sensor is decreased and the image data output speed of the image sensor is increased. In addition, the image sensor performs efficient image processing.

While the inventive concept has been particularly shown and described with reference to exemplary embodiments thereof, it will be understood by those of ordinary skill in the art that various changes in forms and details may be made therein without departing from the spirit and scope of the inventive concept as defined by the following claims.

What is claimed is:

1. An image sensor comprising:
   a plurality of pixels including a first pixel and a second pixel, the first pixel being configured to output a first pixel signal and a second pixel signal, the first pixel including a first photoelectric conversion element and a second photoelectric conversion element, the second pixel being configured to output a third pixel signal and a fourth pixel signal, the second pixel including a third photoelectric conversion element and a fourth photoelectric conversion element;
   a binning circuit including a plurality of switch circuits that include a first switch circuit and a second switch circuit, the first switch circuit including a plurality of first switches, the second switch circuit including a plurality of second switches; and
   a plurality of analog-to-digital converters (ADCs) including a first ADC and a second ADC,
   wherein the first pixel signal is transferred to a first node of the binning circuit through a first path that includes a first sub-path and a second sub-path, the first sub-path being followed by the second sub-path, the first sub-path being determined by on or off of the plurality of first switches, the second sub-path being determined by on or off of the plurality of second switches,
   the third pixel signal is transferred to the first node of the binning circuit through a second path that includes a third sub-path and a fourth sub-path, the third sub-path being followed by the fourth sub-path, the third sub-path being determined by on or off of the plurality of first switches, the fourth sub-path being determined by on or off of the plurality of second switches,
   the binning circuit bins the first pixel signal and the third pixel signal at the first node, and outputs a first binned pixel signal to the first ADC, and
   at least one of the plurality of ADCs is activated, and the remaining ADCs among the plurality of ADCs are deactivated.

2. The image sensor of claim 1, wherein the first photoelectric conversion element outputs the first pixel signal and the third photoelectric conversion element outputs the third pixel signal, and the first ADC is shared by the first photoelectric conversion element and the third photoelectric conversion element.

3. The image sensor of claim 1, wherein the first switch circuit and the second switch circuit are serially connected between the plurality of pixels and the plurality of ADCs.

4. The image sensor of claim 1, wherein the first ADC converts the first binned pixel signal into a digital signal.

5. The image sensor of claim 1, wherein each of the first pixel and the second pixel are a green pixel.

6. The image sensor of claim 1, wherein the second pixel signal is transferred to a second node of the binning circuit through a third path that includes a fifth sub-path and a sixth sub-path, the fifth sub-path being followed by the sixth sub-path, the fifth sub-path being determined by on or off of the plurality of first switches, the sixth sub-path being determined by on or off of the plurality of second switches,
   the fourth pixel signal is transferred to the second node of the binning circuit through a fourth path that includes a seventh sub-path and an eighth sub-path, the seventh sub-path being followed by the eighth sub-path, the seventh sub-path being determined by on or off of the plurality of first switches, the eighth sub-path being determined by on or off of the plurality of second switches, and
   the binning circuit bins the second pixel signal and the fourth pixel signal at the first node, and outputs a second binned pixel signal to the second ADC.

7. The image sensor of claim 1, wherein the second pixel signal is transferred to the first node of the binning circuit through a third path that includes a fifth sub-path and a sixth sub-path, the fifth sub-path being followed by the sixth sub-path, the fifth sub-path being determined by on or off of the plurality of first switches, the sixth sub-path being determined by on or off of the plurality of second switches,
   the binning circuit bins the first pixel signal and the second pixel signal at the first node, and outputs a third binned pixel signal to the first ADC.

8. The image sensor of claim 1, wherein the plurality of pixels are arranged in a plurality of rows including a first row and a second row,
   the first pixel is disposed in the first row, and
   the second pixel is disposed in the second row.

9. The image sensor of claim 1, wherein the plurality of pixels are arranged in a plurality of rows including a first row and a second row, and
   both the first pixel and the second pixel are disposed in the first row.

10. The image sensor of claim 1, wherein the first pixel is formed in a silicon substrate and a first deep trench isolation is formed between the first photoelectric conversion element and the second photoelectric conversion element, and
    the second pixel is formed in the silicon substrate and a second deep trench isolation is formed between the third photoelectric conversion element and the fourth photoelectric conversion element.

11. An image sensor comprising:
    a plurality of pixels arranged in a plurality of rows including a first row and a second row and including a first pixel and a second pixel, the first pixel being arranged in the first row and configured to output a first pixel signal and a second pixel signal, the first pixel including a first photoelectric conversion element and a second photoelectric conversion element, the second pixel being arranged in the second row and configured to output a third pixel signal and a fourth pixel signal, the second pixel including a third photoelectric conversion element and a fourth photoelectric conversion element;
a binning circuit including a plurality of switch circuits that include a first switch circuit and a second switch circuit, the first switch circuit including a plurality of first switches, the second switch circuit including a plurality of second switches; and
a plurality of analog-to-digital converters (ADCs) including a first ADC and a second ADC,
wherein the first pixel signal is transferred to a first node of the binning circuit through a first path that includes a first sub-path and a second sub-path, the first sub-path being followed by the second sub-path, the first sub-path being determined by on or off of the plurality of first switches, the second sub-path being determined by on or off of the plurality of second switches,
the third pixel signal is transferred to the first node of the binning circuit through a second path that includes a third sub-path and a fourth sub-path, the third sub-path being followed by the fourth sub-path, the third sub-path being determined by on or off of the plurality of first switches, the fourth sub-path being determined by on or off of the plurality of second switches, and
the binning circuit bins the first pixel signal and the third pixel signal at the first node, and outputs a first binned pixel signal to the first ADC.

12. The image sensor of claim 11, wherein at least one of the plurality of ADCs is activated, and the remaining ADCs among the plurality of ADCs are deactivated.

13. The image sensor of claim 11, wherein the second pixel signal is transferred to a second node of the binning circuit through a third path that includes a fifth sub-path and a sixth sub-path, the fifth sub-path being followed by the sixth sub-path, the fifth sub-path being determined by on or off of the plurality of first switches, the sixth sub-path being determined by on or off of the plurality of second switches,
the fourth pixel signal is transferred to the second node of the binning circuit through a fourth path that includes a seventh sub-path and an eighth sub-path, the seventh sub-path being followed by the eighth sub-path, the seventh sub-path being determined by on or off of the plurality of first switches, the eighth sub-path being determined by on or off of the plurality of second switches, and
the binning circuit bins the second pixel signal and the fourth pixel signal at the first node, and outputs a second binned pixel signal to the second ADC.

14. The image sensor of claim 11, wherein the second pixel signal is transferred to the first node of the binning circuit through a third path that includes a fifth sub-path and a sixth sub-path, the fifth sub-path being followed by the sixth sub-path, the fifth sub-path being determined by on or off of the plurality of first switches, the sixth sub-path being determined by on or off of the plurality of second switches,
the binning circuit bins the first pixel signal and the second pixel signal at the first node, and outputs a third binned pixel signal to the first ADC.

15. The image sensor of claim 11, wherein at least one of the plurality of second switches is connected both to a sub-path originated from the first pixel and to a sub-path originated from the second pixel, and
the at least one of the plurality of second switches is connected both to a sub-path arriving the first ADC and to a sub-path arriving the second ADC.

16. An image sensor comprising:
a plurality of pixels arranged in a plurality of rows including a first row and including a first pixel and a second pixel, the first pixel being arranged in the first row and configured to output a first pixel signal and a second pixel signal, the first pixel including a first photoelectric conversion element and a second photoelectric conversion element, the second pixel being arranged in the first row and configured to output a third pixel signal and a fourth pixel signal, the second pixel including a third photoelectric conversion element and a fourth photoelectric conversion element;
a binning circuit including a plurality of switch circuits that include a first switch circuit and a second switch circuit, the first switch circuit including a plurality of first switches, the second switch circuit including a plurality of second switches; and
a plurality of analog-to-digital converters (ADCs) including a first ADC and a second ADC,
wherein the first pixel signal is transferred to a first node of the binning circuit through a first path that includes a first sub-path and a second sub-path, the first sub-path being followed by the second sub-path, the first sub-path being determined by on or off of the plurality of first switches, the second sub-path being determined by on or off of the plurality of second switches,
the third pixel signal is transferred to the first node of the binning circuit through a second path that includes a third sub-path and a fourth sub-path, the third sub-path being followed by the fourth sub-path, the third sub-path being determined by on or off of the plurality of first switches, the fourth sub-path being determined by on or off of the plurality of second switches, and
the binning circuit bins the first pixel signal and the third pixel signal at the first node, and outputs a first binned pixel signal to the first ADC.

17. The image sensor of claim 16, wherein at least one of the plurality of ADCs is activated, and the remaining ADCs among the plurality of ADCs are deactivated.

18. The image sensor of claim 16, wherein the second pixel signal is transferred to a second node of the binning circuit through a third path that includes a fifth sub-path and a sixth sub-path, the fifth sub-path being followed by the sixth sub-path, the fifth sub-path being determined by on or off of the plurality of first switches, the sixth sub-path being determined by on or off of the plurality of second switches,
the fourth pixel signal is transferred to the second node of the binning circuit through a fourth path that includes a seventh sub-path and an eighth sub-path, the seventh sub-path being followed by the eighth sub-path, the seventh sub-path being determined by on or off of the plurality of first switches, the eighth sub-path being determined by on or off of the plurality of second switches, and
the binning circuit bins the second pixel signal and the fourth pixel signal at the first node, and outputs a second binned pixel signal to the second ADC.

19. The image sensor of claim 16, wherein the second pixel signal is transferred to the first node of the binning circuit through a third path that includes a fifth sub-path and a sixth sub-path, the fifth sub-path being followed by the sixth sub-path, the fifth sub-path being determined by on or off of the plurality of first switches, the sixth sub-path being determined by on or off of the plurality of second switches,
the binning circuit bins the first pixel signal and the second pixel signal at the first node, and outputs a third binned pixel signal to the first ADC.

20. The image sensor of claim 16, wherein at least one of the plurality of second switches is connected both to a sub-path originated from the first pixel and to a sub-path originated from the second pixel, and the at least one of the plurality of second switches is connected both to a sub-path arriving the first ADC and to a sub-path arriving the second ADC.

* * * * *